US009489243B2

(12) United States Patent
Srikanth et al.

(10) Patent No.: US 9,489,243 B2
(45) Date of Patent: Nov. 8, 2016

(54) FEDERATING COMPUTING RESOURCES ACROSS THE WEB

(75) Inventors: Munirathnam Srikanth, Redmond, WA (US); Steve Jamieson, Bellevue, WA (US)

(73) Assignee: ComputeNext Inc., Bellevue, WA (US)

( * ) Notice: Subject to any disclaimer, the term of this patent is extended or adjusted under 35 U.S.C. 154(b) by 186 days.

(21) Appl. No.: 13/454,764

(22) Filed: Apr. 24, 2012

(65) Prior Publication Data

US 2013/0198386 A1    Aug. 1, 2013

Related U.S. Application Data

(60) Provisional application No. 61/591,216, filed on Jan. 26, 2012.

(51) Int. Cl.
*G06F 15/173* (2006.01)
*G06F 9/50* (2006.01)
*G06F 15/16* (2006.01)

(52) U.S. Cl.
CPC .................................. *G06F 9/5061* (2013.01)

(58) Field of Classification Search
CPC ........ G06F 9/507; G06F 12/08; G06F 11/34; H04L 67/10
USPC ........................... 709/221, 226, 243; 718/104
See application file for complete search history.

(56) References Cited

U.S. PATENT DOCUMENTS

| | | | |
|---|---|---|---|
| 6,990,513 B2 * | 1/2006 | Belfiore et al. ............... 709/203 |
| 7,043,472 B2 * | 5/2006 | Aridor et al. |
| 7,926,089 B2 * | 4/2011 | Tulshibagwale et al. ........ 726/4 |
| 8,230,070 B2 * | 7/2012 | Buyya ................... G06F 9/5072 709/201 |
| 8,595,346 B2 * | 11/2013 | Bairavasundaram . G06F 9/5011 709/223 |
| 8,606,897 B2 * | 12/2013 | Ferris ..................... G06Q 10/00 705/80 |
| 8,775,626 B2 * | 7/2014 | Teather ................... H04L 47/70 709/226 |
| 8,918,449 B2 * | 12/2014 | Patel ...................... G06F 9/547 709/202 |
| 9,015,324 B2 * | 4/2015 | Jackson ................ G06F 9/5027 709/201 |
| 9,069,599 B2 * | 6/2015 | Martinez ................. G06F 9/455 |
| 9,077,726 B2 * | 7/2015 | Pujare et al. |
| 9,104,738 B2 * | 8/2015 | Kay .................. G06F 17/30563 |
| 2009/0177697 A1 * | 7/2009 | Gao et al. .................. 707/104.1 |
| 2009/0235268 A1 * | 9/2009 | Seidman et al. .............. 718/104 |
| 2009/0276540 A1 * | 11/2009 | Ahn et al. ..................... 709/243 |

(Continued)

OTHER PUBLICATIONS

International Search Report and Written Opinion mailed Sep. 16, 2014, issued in corresponding International Application No. PCT/US2013/023142, filed Jan. 25, 2013, 7 pages.

(Continued)

*Primary Examiner* — Melvin H Pollack
(74) *Attorney, Agent, or Firm* — Christensen O'Connor Johnson Kindness PLLC

(57) ABSTRACT

Hardware and software are configured to select and provision computing resources from heterogeneous on-demand computing environments through the framework of a layered, federated on-demand computing ecology of computing resource providers, users, and federation servers. These pieces of hardware and software include a mechanism for defining and managing the life cycle of different resource types; a mechanism for extending document-centric protocols to support computing resources as first order objects; a mechanism for routing messages to computing resources; federation topologies; and a mechanism for federation servers to access and use computing resources from providers controlled by other federation servers.

12 Claims, 22 Drawing Sheets

(56) References Cited

U.S. PATENT DOCUMENTS

| | | | |
|---|---|---|---|
| 2010/0058334 A1 | 3/2010 | Mohindra | |
| 2010/0085948 A1* | 4/2010 | Yu et al. | 370/338 |
| 2010/0131624 A1* | 5/2010 | Ferris | 709/221 |
| 2010/0299738 A1* | 11/2010 | Wahl | 726/9 |
| 2011/0119381 A1* | 5/2011 | Glover et al. | 709/226 |
| 2011/0126197 A1 | 5/2011 | Larsen | |
| 2011/0213687 A1* | 9/2011 | Ferris | G06Q 30/04 705/34 |
| 2011/0213712 A1* | 9/2011 | Hadar | G06Q 30/04 705/80 |
| 2011/0238737 A1* | 9/2011 | Agrawal | G06F 9/5072 709/203 |
| 2012/0131591 A1* | 5/2012 | Moorthi | G06Q 30/00 718/104 |
| 2012/0254326 A1* | 10/2012 | Bellan et al. | 709/206 |
| 2013/0060946 A1* | 3/2013 | Kenneth et al. | 709/226 |
| 2013/0297800 A1* | 11/2013 | Considine | G06F 9/5088 709/226 |
| 2015/0244580 A1* | 8/2015 | Saavedra | H04L 41/0816 709/221 |

OTHER PUBLICATIONS

Supplementary Partial European Search Report mailed Dec. 7, 2015, issued in corresponding European Application No. EP 13703246, filed Jan. 25, 2013, 6 pages.

Bernstein, D., and D. Vij, "Intercloud Directory and Exchange Protocol Detail Using XMPP and RDF," 2010 IEEE 6th World Congress on Services, Jul. 5, 2010, Piscataway, New Jersey, pp. 431-438.

* cited by examiner

FEDERATING COMPUTING RESOURCES ACROSS THE WEB

CROSS-REFERENCE TO RELATED APPLICATION

The application claims the benefit of Provisional Application No. 61/591,216, filed Jan. 26, 2012, which is incorporated herein by reference.

TECHNICAL FIELD

The present subject matter is generally related to software, and more particularly, it relates to cloud computing.

BACKGROUND

On-demand computing environments like cloud computing are accessed by modern computing users to procure and use computing resources on-demand. In these conventional environments, different users' tasks have different requirements that are satisfied by a variety of computing resource providers. However, there is a lack of computing platforms that facilitate users' ability to select cloud computing resources from a variety of marketplaces that are comprised of one or more computing resource providers. Especially glaring is the lack of opportunity for a computing resource provider to expose and enable users to procure and use their specific services in a way that is distinguishable from other providers. These different services are unfortunately exposed through esoteric, custom interfaces with no mechanism for ease of access or use by users.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system form of the subject matter includes a system in which the first and second federation servers are each connected to a set of computing resource providers, each of which in turn is connected to a set of computing resources. The first and second federation servers are recited in that each is configured to determine which computing resources are allocated and which are available to users who issue on-demand computing requests. The system further comprises the first federation server having a computer-readable federation catalog which lists the second federation server, and the second federation server having a computer-readable federation catalog which lists the first federation server to which the second federation server maintains communication to either request a computer-readable catalog of computing resources of a computing resource provider connected to the first federation server or communicate an on-demand computing request to the first federation server.

A method form of the subject matter recites a method which comprises receiving either a control or a data message by a member of a group consisting essentially of a user's agent, a federation server, a computing resource provider, or a computing resource. The method further recites causing a stage transition in a life cycle of a computing resource if the message is a control message and causing a reading or a writing of data if the message is a data message.

A computer-readable medium form of the subject matter recites a method which comprises receiving either a control or a data message by a member of a group consisting essentially of a user's agent, a federation server, a computing resource provider, or a computing resource. The method further recites causing a stage transition in a life cycle of a computing resource if the message is a control message and causing a reading or a writing of data if the message is a data message.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
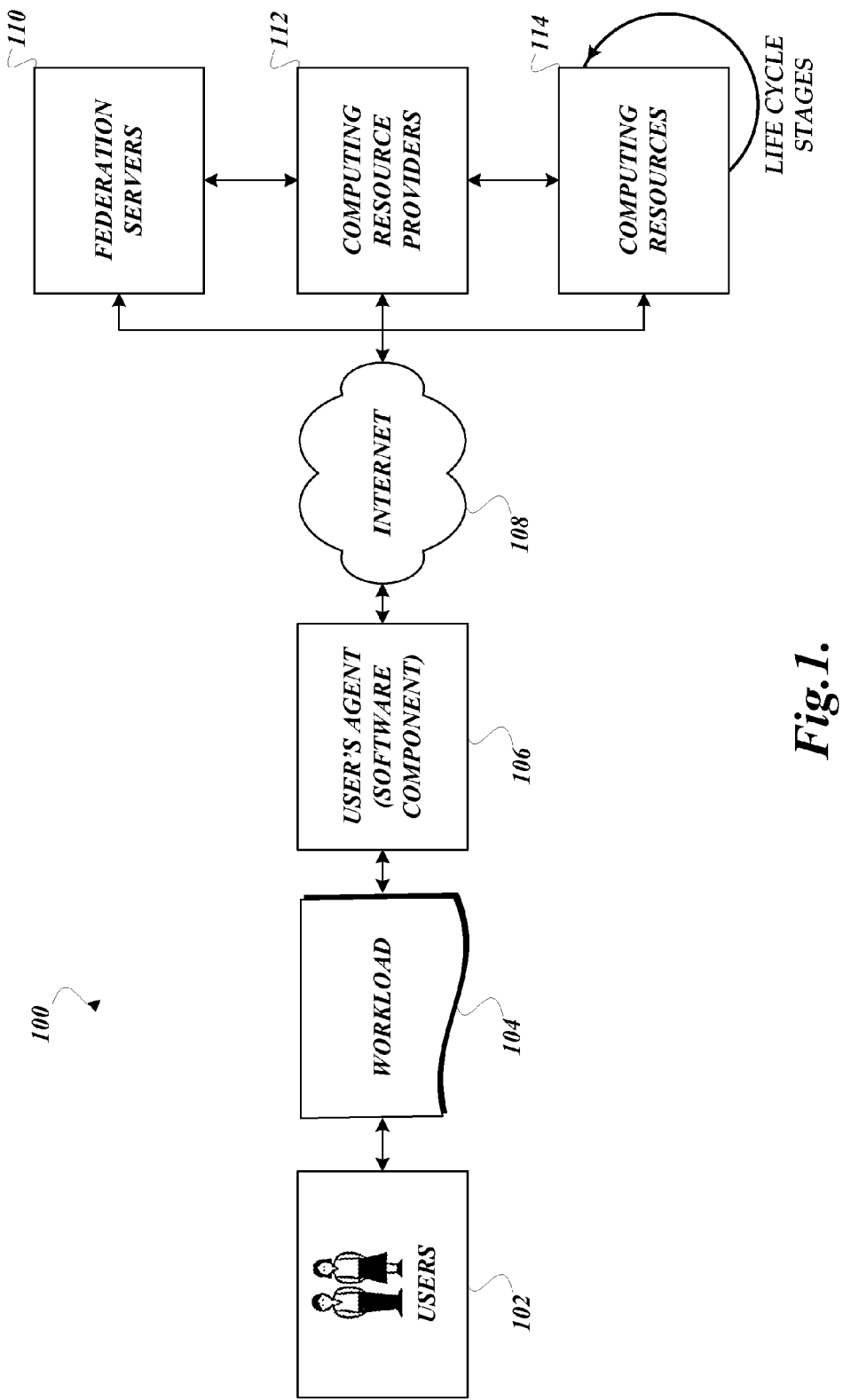
FIG. 1 is a block diagram of an archetypical system in accordance with various embodiments of the present subject matter.
Figure 2:
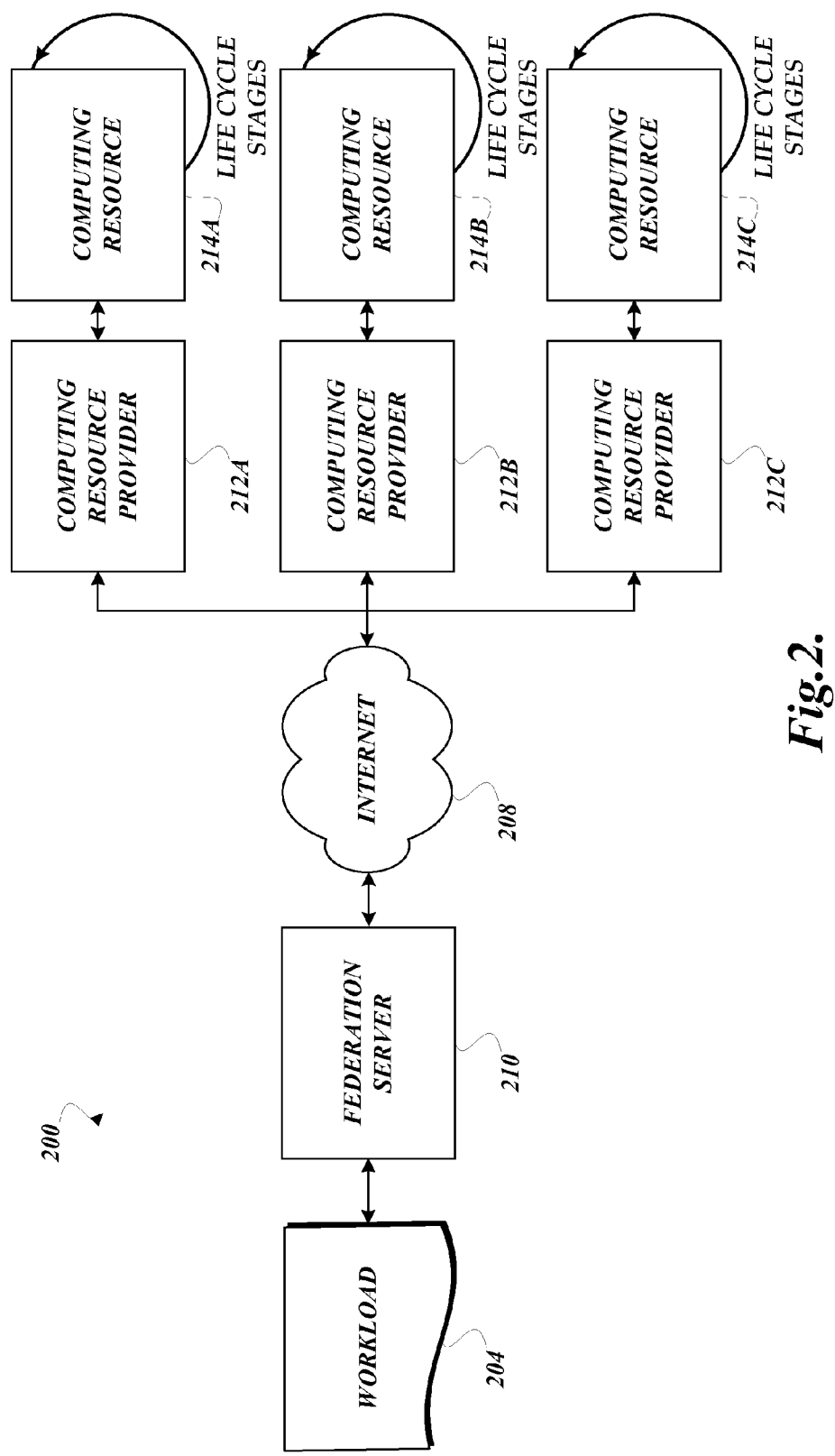
FIG. 2 is a block diagram illustrating an archetypical system in accordance with various embodiments of the present subject matter.
Figure 3:
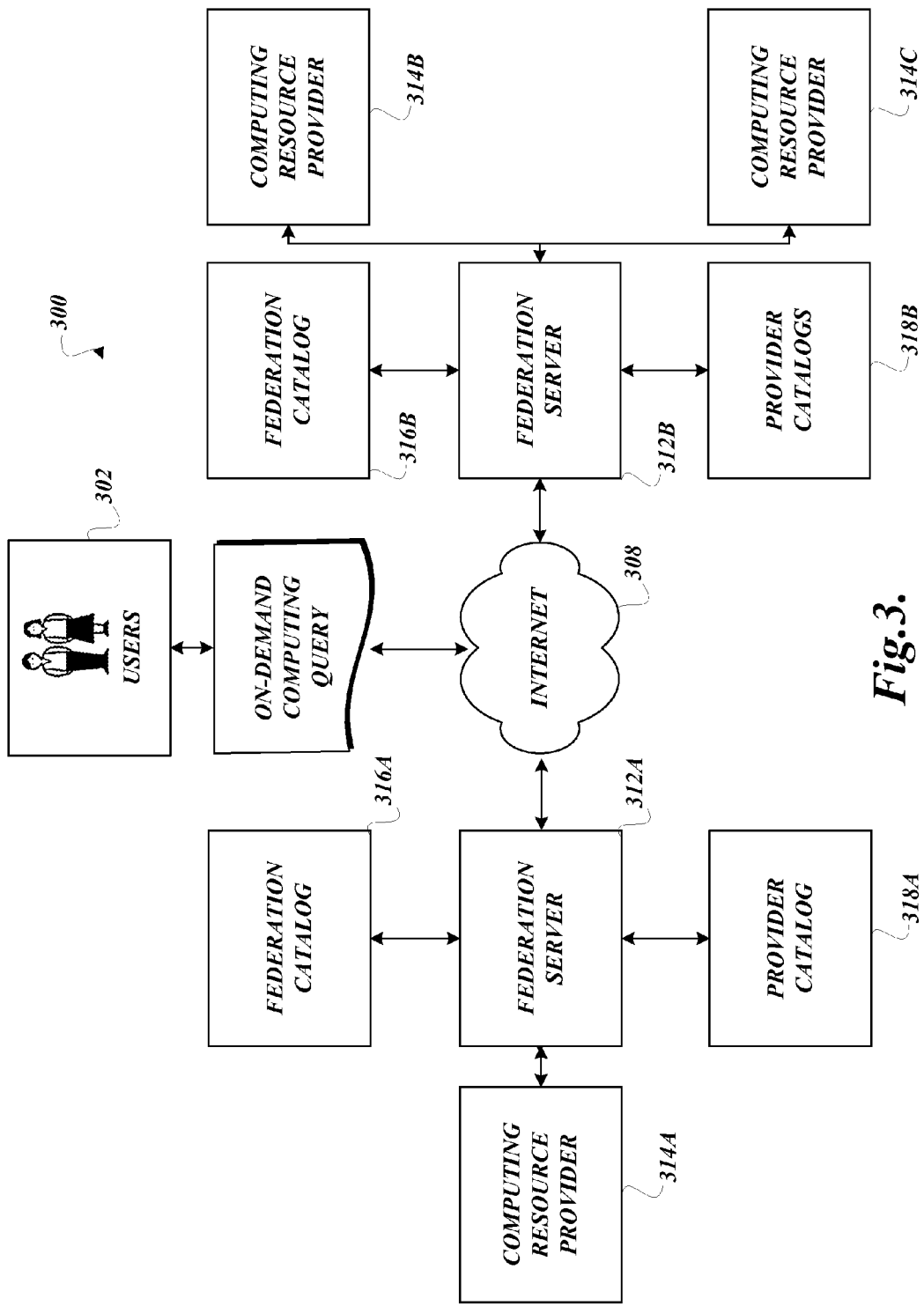
FIG. 3 is a block diagram illustrating an archetypical system in accordance with various embodiments of the present subject matter.

FIGS. 1, 2, and 3 are block diagrams of networked systems comprising pieces of hardware on which pieces of software execute to implement the functionalities discussed herein below. FIG. 1 illustrates federations of computing marketplaces 100 in which users 102 present a search request in the form of a workload 104 (or in other forms, such as computational functions or tasks) to discover computing resources in one or more federations of computing marketplaces 100 composed of federation servers 110, computing resource providers 112, and computing resources 114. The federations 100 realize and implement the work flow 104 as a transaction. The work flow which is triggered by the user 104 requesting computing resources and which is concluded by release of the resources is called a transaction. The transaction manages the life cycle of the computing resources 114 exchanged between the computing resource providers 112, the users 102, and the federation servers 110. Each federation server 110 participates in a setup phase, a usage phase and a tear down phase. The federation server's services are realized through different interfaces including web services. The interfaces provide a method for procuring and provisioning computing resources with different realizations including as a physical machine, virtual machines, an application stack, storage, a network and so on. The federation server enables interaction with homogenous and heterogeneous on-demand computing environments as well as other federated on-demand computing environments. Participation in the life cycle enables computing resources' health monitoring as well as usage measurement. The data collected from the life cycle creates services such as fault recovery, billing reconciliation, and business intelligence analysis.

These federations of computing marketplaces 100 provide on-demand computing resources (i.e., cloud computing environments) of different kinds, in different sizes, and for suitable amounts of time to perform different computational tasks. These federations can be accessed for different computing requirements that may be suitably satisfied by a variety of computing resource providers. These federations are platforms to enable computing resources users to dynamically select from a variety of computing resource marketplaces (such as public, private, hybrid, or community federations) that appropriately match (in some embodiments) their current needs against past, present, and/or projected future utilization, procure/provision computing resources with optional movement of data/code (in a few embodiments), and utilize computing resources from one or more providers. These federations, in other embodiments, also can expose and enable users to procure and use service offerings that distinguish one provider from another. The different service offerings are exposed through custom interfaces at a low level closest to the computing resources while at a high level users use normalizing mechanisms to access these different service offerings as if they were offered by any computing resource providers hence unifying accesses across different platforms of different computing resource providers.

These marketplaces of various embodiments are where users' workloads that need to be run can find appropriate computing resources provisioned from a single provider or multiple providers. These marketplaces also enable computing resource providers to publish their computing resources, such as in a computer-readable catalog, so that they can be appropriately matched to users' workloads as well as computing resources related to these workloads. Cloud computing brokers can find matching computing resources using cloud federations and fulfill the workloads. Alternate pull and push technologies, including alerts or emails, are included to enable the marketplaces for computing resources in a few embodiments. Several levels of resource provision can be enabled in various marketplaces ranging from a single computing resource to dynamically validating and recommending alternate sets of computing resources for new as well as ongoing workloads.

Returning to FIG. 1, a user's agent 106 (as a software component) may act on behalf of the users 102 to forward the workload 104 (or other computational functions or tasks) to federation servers 110 via the Internet 108. The user's agent 106 or the federation servers 110 may interact with computing resource providers 112 or computing resources 114 indirectly or directly. Each computing resource 114 has a life cycle in which various stages are controllable to transition the computing resource from one stage to the next. These stage transitions are caused by either the user 102 or the user's agent 106. The user's agent 106 helps to select, procure, and provision computing resources from heterogeneous on-demand computing environments, which are formed and operated as a web of computing resources through layers of computing resource federation servers 110. The federations of computing marketplaces 100 extend conventional predefined protocols for access and use of document-like resources to include computing resources of different types defined at different levels of computation abstraction such as Infrastructure-as-a-Service (IaaS), Platform-as-a-Service (PaaS), Software-as-a-Service (SaaS), and Database-as-a-Service (DaaS).

Regarding the extension of conventional Internet protocols, a number of embodiments of the present subject matter include a mechanism for extending a document-centric view of documentary resources to support computing resources as first order objects with associated protocol methods. These methods are used to indicate the stage change requests to the computing resources from users of the computing resources. As an illustrative example, a tag-based protocol, such as Hypertext Transfer Protocol (and other internet protocols) operates on the notion of documentary resources. Documents mostly have static content and their states are managed outside the scope of the access and utilization realized through various protocols. The number of embodiments of the present subject matter extend the tag-based protocol using key words to recognize computing resources so as to allow the protocol methods to operate on the computing resources by causing them to transition to various stages of their life cycle.

In other words, computing resources can be added as primitive objects in different protocols. Using the Hypertext Transfer Protocol mentioned above, Internet Media Type (IMT) (originally called Multipurpose Internet Media Extensions (MIME) types) can be extended to capture and represent computing resources and their subtypes. The stages of the computing resource and associated actions are possible. For example, compute type can be defined as a type of resource with different subtypes including a physical machine (by textually invoking "PhysicalMachine" in a protocol expression), a virtual machine (by textually invoking "VirtualMachine" in a protocol expression), and a storage medium (by textually invoking "Storage" in a protocol expression). The taxonomy of subtypes under compute type is derived from the ontology of computing resources.

Various embodiments support computing resources at other application level protocols that use different transport level protocols like TCP and/or UDP. The search for computing resources and subsequent selection of computing resources to use for a particular computational task is realized through a Dynamic Computing Selection Protocol (DCSP) that is a network configuration protocol for federation servers on federation networks. Federation servers that are connected to federation networks can suitably be configured before they can communicate with other federation servers. One piece of information for networking is an internet protocol address, and a default route and routing prefix. DCSP also provides a central database of federation servers that are connected to the network and eliminates duplicate computing resource assignments. The DCSP protocol provides the ability to discover federation servers that can enable the search and discovery of computing resources, as well as request, configure, use, and release such resources for particular workloads. DCSP can support, among other models, a client-server model with users' agents behaving like clients that use DCSP protocol to search, select, provision and use computing resources.

The life cycle stages of computing resources 114 are depicted pictorially by an arrow in a circular pattern that self-references the computing resources 114. Computing resources comprise different types with different attributes and taxonomies of values. Various embodiments of the present subject matter curate such information as part of a computing resource repository and/or knowledge base. Instances of these computing resource types are instantiated by computing resource providers and these computing resources transition through different stages of their lifecycle from creation, to configuration, to utilization, and finally termination. For example, a virtual machine is a computing resource that enables software packaged in images to run on the computing resource. The virtual machine computing resource has different attributes including CPU speed (e.g., 1, GHz) and memory (e.g., 1, GB). Virtual machine computing resources are allocated on a physical machine and utilized by users 102. They are able to control the stage of the computing resource through particular stage change commands. Such commands are specifically defined by the on-demand computing environment of the computing resource provider and such commands change from one provider to another. In various embodiments of the present subject matter, such commands are low level details that are abstracted to higher level commands that can be used by any users 102 to command any computing resources 114 to transition through stages of their life cycle.

As discussed, different types of computing resources support different methods to manage their stages. Various embodiments of the present subject matter define the taxonomy of resource stages and actions in the form of a workflow for stage changes that cover different types of computing resources via the higher level commands. The workflow stages are associated with methods to initiate the state changes. For the purpose of computing resource life cycle management in an on-demand computing environment, methods or actions on a computing resource can be broadly classified into control and data methods. Control methods are geared toward managing a computing resource and its life cycle. Data methods focus on utilizing the computing resource. For example, the methods to allocate and start a virtual machine are control methods while the methods to access the web page hosted in the virtual machine are data methods. These higher level commands are discussed herein below.

FIG. 2 illustrates a federation 200 in which a workload 204 is presented by a federation server 210 through an Internet 208 to various computing resource providers 212a-212c. In one embodiment, each computing resource provider has access to a respective computing resource 214a-214c, in which its life cycle stage's transition is controllable by the computing resource provider 212a-212c. In other embodiments, each computing resource provider 212a-212c, may have access to more than one computing resource. These computing resources 214a-214c, can be provisioned by users 102 or their user's agent 106. For example, cloud providers in the IaaS and PaaS space and some on-demand computing hosting providers have developed capabilities to enable users to self-provision computing resources using user interfaces and application programming interfaces (APIs) that can be used in their development and/or production environments. Each computing resource provider has its own set of resource descriptions including pricing and access information and APIs to connect, authorize, access, and use these computing resources. The APIs also support the temporary or permanent de-allocation of resources as well as scale up/scale down utilization. The APIs are realized through different internet protocols with many of them providing a document view of computing resources. The methods exposed on these computing resources present a static view of an otherwise dynamic computing resource. Various embodiments of the present subject matter extend that view to define computing resources and associate particular methods to access and operate computing resources across multiple computing resource providers without regard to the different APIs of various computing resource providers.

Various embodiments of the present subject matter provide mechanisms to automatically find these computing resource providers and their special offerings, dynamically select, allocate, and use computing resources across different computing resource providers to perform a workload or task, and selectively de-allocate utilized computing resources based on task performance and usage. By analyzing big data provided by the awareness of on-demand computing resource providers of their existing customers and their needs at the level of the computing resources and the big data of the eco-system of cloud management systems that are aware of the particular tasks and workloads that are being performed using these computing resources, various embodiments of the present subject matter, in some embodiments, assist computing resource providers to better model their configurations and setup.

Regarding the special offerings of computing resource providers 212a-212c, various embodiments provide a mechanism to pass through and make use of special features and capabilities as well as services of computing resources 214a-214c, as exposed by the computing resource providers 212a-212c. Each computing resource provider 212a-212c, and each computing resource 214a-214c, may have special services that they provide to their users. The ability to find and provision computing resources 214a-214c, in a heterogeneous environment captures the common capabilities and exposes them through the user's agents. Various embodiments discover and expose special services to the user through the user's agents. The user's agent, which can be likened to a web browser, provides common programming interfaces for users to access and use the web of computing resources as facilitated by the federation server 210. Common methods and messages are used to operate on computing resources 214a-214c, independent of the computing provider 212a-212c, and their platforms For example, a virtual machine computing resource from a computing resource provider A is accessed and managed through the same set of methods as computing resource provider B. A few embodiments enable the capability of the computing resource provider B to possess additional services, and in terms of plug-ins to the user's agent that support them, expose and enable users to use those special services. In the same example, a set of APIs are exposed by the user's agent. One approach to support such API extensions by the computing resource provider and computing resource is to include a generic interface to request special messages to be sent to the computing resource provider or the computing resource by packaging the message type and parameters in a standard tag-based format (such as XML). The call of an extension method to a computing resource is executed if the computing resource can interpret and respond. Otherwise, the call is ignored.

Various embodiments of the present subject matter facilitate federated cloud ecology adopting, in many embodiments, an information architecture that encompasses different (predefined or learned) types of computing resources and their attributes, compute resource providers and their attributes, potential and existing computing resource users and their attributes, and different layers of federation servers; in some embodiments, a mechanism for the federated cloud eco-system to capture and discover metadata about computing resource providers and federation servers; and in a few embodiments, a mechanism to provision within and across computing resource federations.

Users of the federation 200 register with the federation server 210 to access and utilize computing resources 214a-214c, from one or more computing resource providers 212a-212c, registered with the same federation server 210. Users of the federation server 210 define the computing resources they require as part of the workload 204. That may include both virtual machine and storage computing resources, as well as the other computing resources required to access and use both the virtual machine and storage computing resources successfully, which in various embodiments include key pairs, security groups, elastic IP addresses, and so on. Definition of the workload 204 includes dependencies among elements of the workload 204, which defines which computing resource depends on which other computing resource, which in turn determines an order in which those computing resources are provisioned, started, stopped, and un-provisioned. When the workload 204 as a whole is provisioned, the federation server 210 determines the computing resource provider 212a-212c, required for each computing resource 214a-214c, and provisions each computing resource 214a-214c, at each different computing resource provider 212a-212c, (that is connected to the federation server 210) using the protocols supported by that computing resource provider 212a-212c. Determining which computing resource provider 212a-212c, to use is directed by the user, in a few embodiments, or the federation server 210, in other embodiments, which uses its own mechanisms to determine which computing resource provider 212a-212c, suitably meets the user's needs, based on the definition of the user's requirements (in the workload 204). The definition may include service level agreements or price, or stated and historical performance of the computing resource provider (as observed analytically and recorded by the federation server 210). Other networked federation servers have authentication mechanisms in place so that they can trust the observed and recorded information provided to them from their networked federation servers.

FIG. 3 illustrates two federations 300 in which users 302 present a search request (or an on-demand computing query) to federation servers 312a-312b, (each representing one federation for the sake of simplicity) via the Internet 308. The federation server 312a, is directly connected to a computing resource provider 314a. The federation server 312a, also has access to a federation catalog 316a, which is computer-readable. The federation server 312a, also has access to a provider catalog 318a, which is computer-readable. The federation server 312b, has access to computing resource providers 314b, 314c. The federation server 312b, also has access to federation catalog 316b, and provider catalogs 318b.

The two federation servers 312a-312b, may not have knowledge of other federation servers, but are connected in a network with only knowledge of their closest neighbors. The federation servers 312a-312b, may be restricted to certain uses in some embodiments, such as for specific companies or enterprises. The requests that are passed along from federation server to federation server take into account these restrictions and other criteria such as geographical location and service level agreements. The federation servers 312a-312b, can be connected and networked in different configurations or topologies. A hierarchical organization would indicate local federation server support for a user's agents and computing resource providers in a given locality (e.g. Los Angeles area). Different federation servers can be grouped and placed under a regional federation that can cover a wider area (e.g. a Southwest federation including the Los Angeles and Phoenix federations). The hierarchy can go to the next level covering a country-wide federation, or perhaps a global or world federation. Alternate topologies can create cliques among regional federations that can help in procuring and provisioning resources across federations.

The two federations 300 illustrate mechanisms for routing of messages to computing resources from users' agents to computing resource federation servers 312a-312b, and computing resource providers 314a, 314b, and 314c. The users' agents, as software components, have software ability to search for computing resources and dynamically select to provision computing resource on behalf of a user. The provisioned computing resources may be sourced from one or more computing resource providers 314a-314c, and each computing resource may be managed and accessed through different sets of methods. These methods are realized as messages among the user's agent and the federation server 312a-312b, and the computing resource provider or the computing resource itself. For example, allocating a computing resource is a message that is directed toward a federation server 312a-312b, or a computing resource provider 314a-314c; reading or writing a blob of data is another message that is directed toward a federation server 312a-312b, or a computing resource provider 314a-314c. Whereas the messages of allocation are controlling the life cycle of a computing resource, the messages of reading or writing are toward using the data of the computing resource. These are respectively referred to as control messages and data messages. To federate computing resources, the federation server 312a-312b, suitably handles and/or is aware of all messages. A group of embodiments dynamically characterize messages as control messages or data messages, defining and enabling the flow of such messages across the federation network. Certain messages go through the federation server 312a-312b, while others are addressed directly to the computing resource provider 314a-314c, or the computing resource. The rules and models for routing the messages are dynamically provided to the user's agent.

In a set-up where there are multiple, heterogeneous computing resource providers 314a-314c, for computing resources for a single user's agent, the details of messages and flow models are provided to the user's agent. These models can be updated dynamically and each message, based on its characterization, adopts a particular flow from the source endpoint of the user's agent. In addition to adopting a different flow model, the user's agent may need to transform messages that are in the formats that would be understood by the computing resource provider 314a-314c. Such transformation rules and models are encoded or dynamically updated by the federation server 312a-312b, to enable the user's agent to communicate with multiple computing resource providers.

The federations 300 provide a mechanism for publishing and search across federation servers 312a-312b, for computing resources and computing resource providers 314a-314c, and the mechanisms for federation servers 312a-312b, to access and use computing resources from computing resource providers controlled by other federation servers 312a-12b. A hybrid model is also possible, wherein the originating federation server accesses directly the computing resource providers, but informs each connected federation server that it is doing so. This hybrid model also assumes that access (to the computing resource providers) can be delegated from the connected federation server, which might not always be the case.

In some embodiments, it is possible that co-operating federation servers might be part of the same overall single federation or may be parts of multiple independent federations. The protocols used to communicate about behavior may be different in each case. In the case of a single federation it can be assumed that each federation server can share the computing resource provider's resources, search results, and catalogs with its neighboring federation servers. It may not have to charge for connected resources as billing is integrated across the federation, and all consumers are known across the federation. For independent, co-operating federations, each provisioned resource may incur a transaction and a charge between federations. It is assumed that the co-operating independent federations have a prior business and billing relationship established before they can communicate and share resources, search results, and catalogs.

Figure 4A:
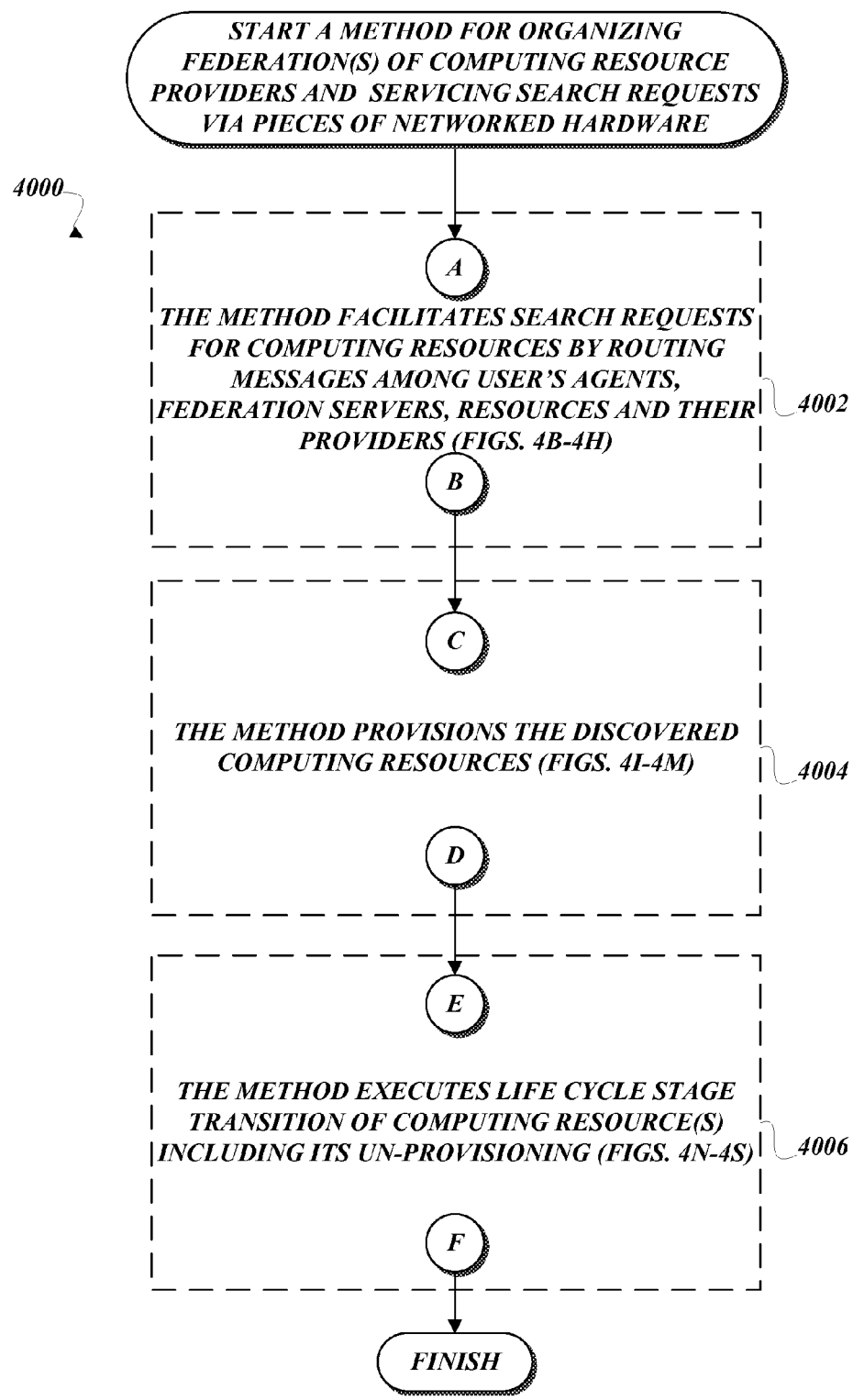
FIGS. 4A-4S are process diagrams illustrating an archetypical software method for organizing federations of computing resource providers and servicing search requests via pieces of network hardware in accordance with various embodiments of the present subject matter.
Figure 4B:
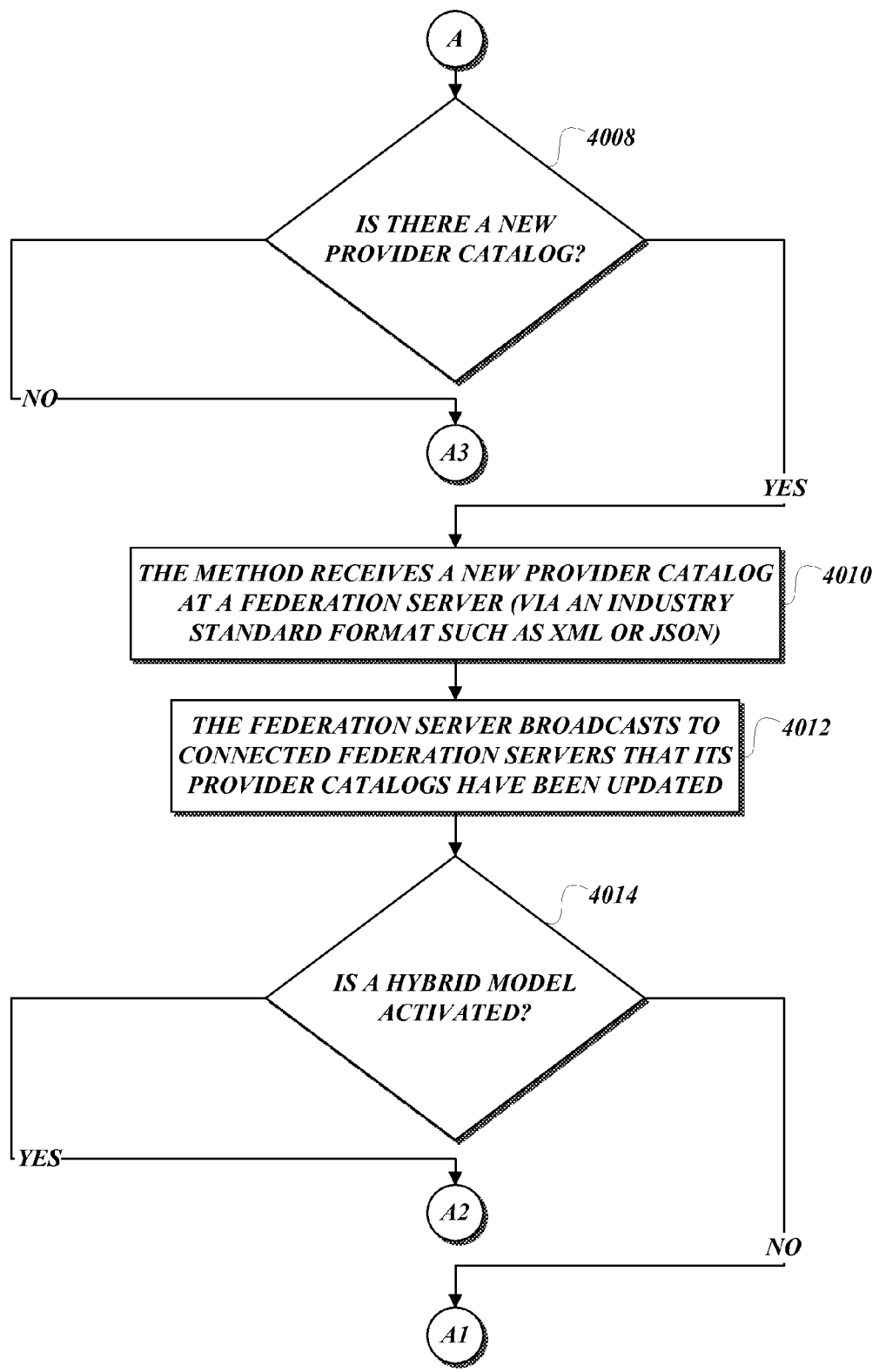
Figure 4C:
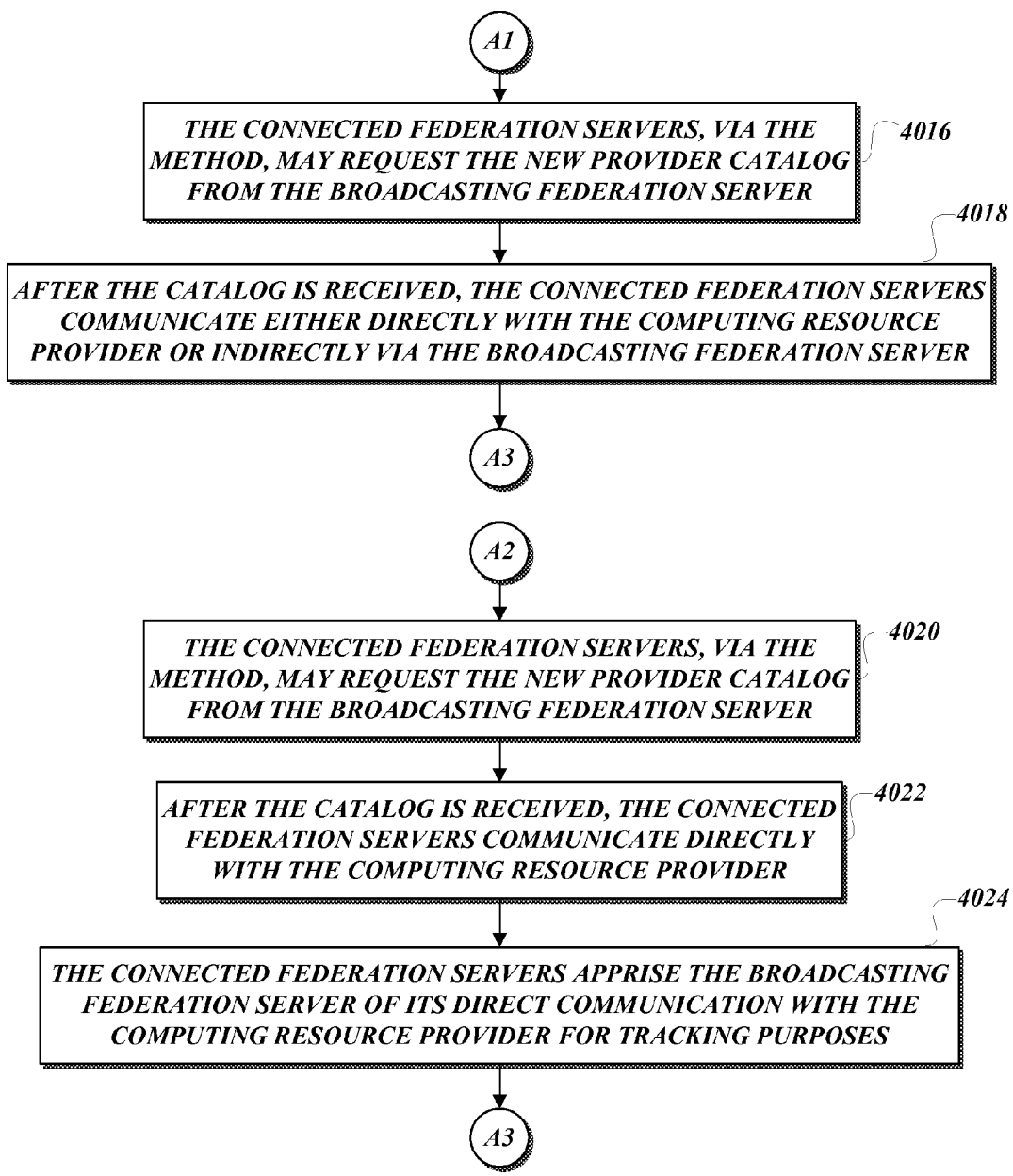
Figure 4D:
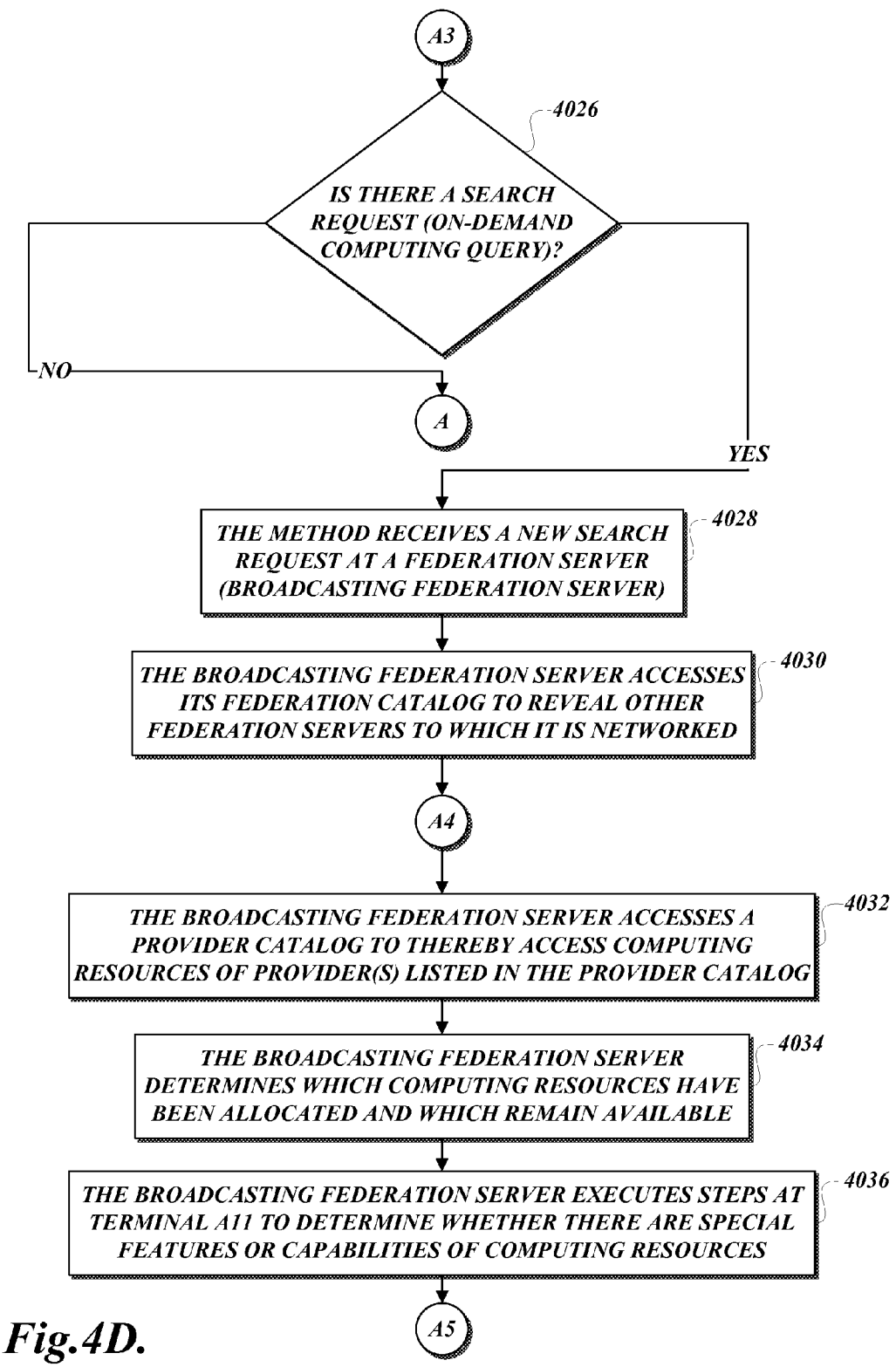
Figure 4E:
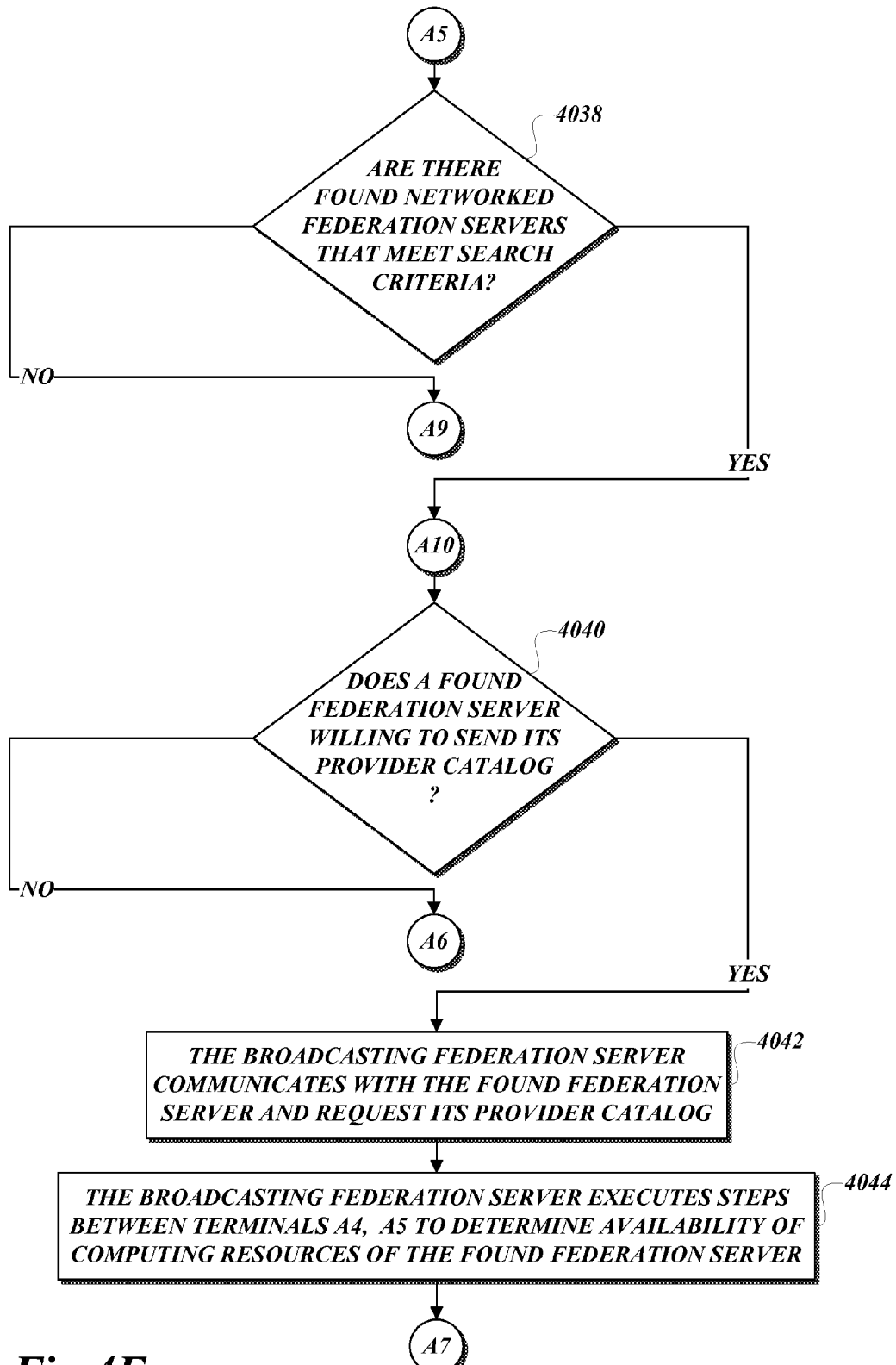
Figure 4F:
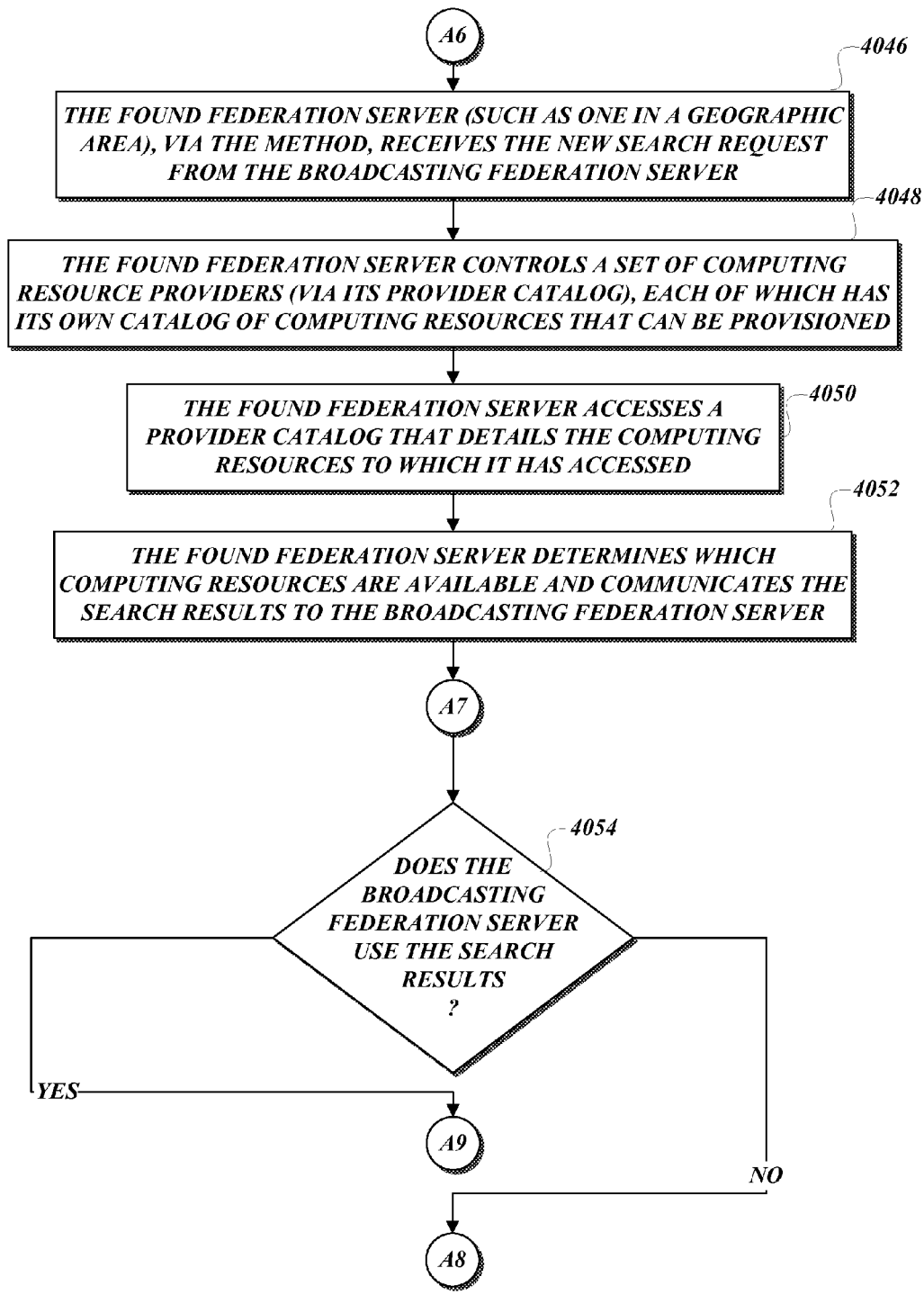
Figure 4G:
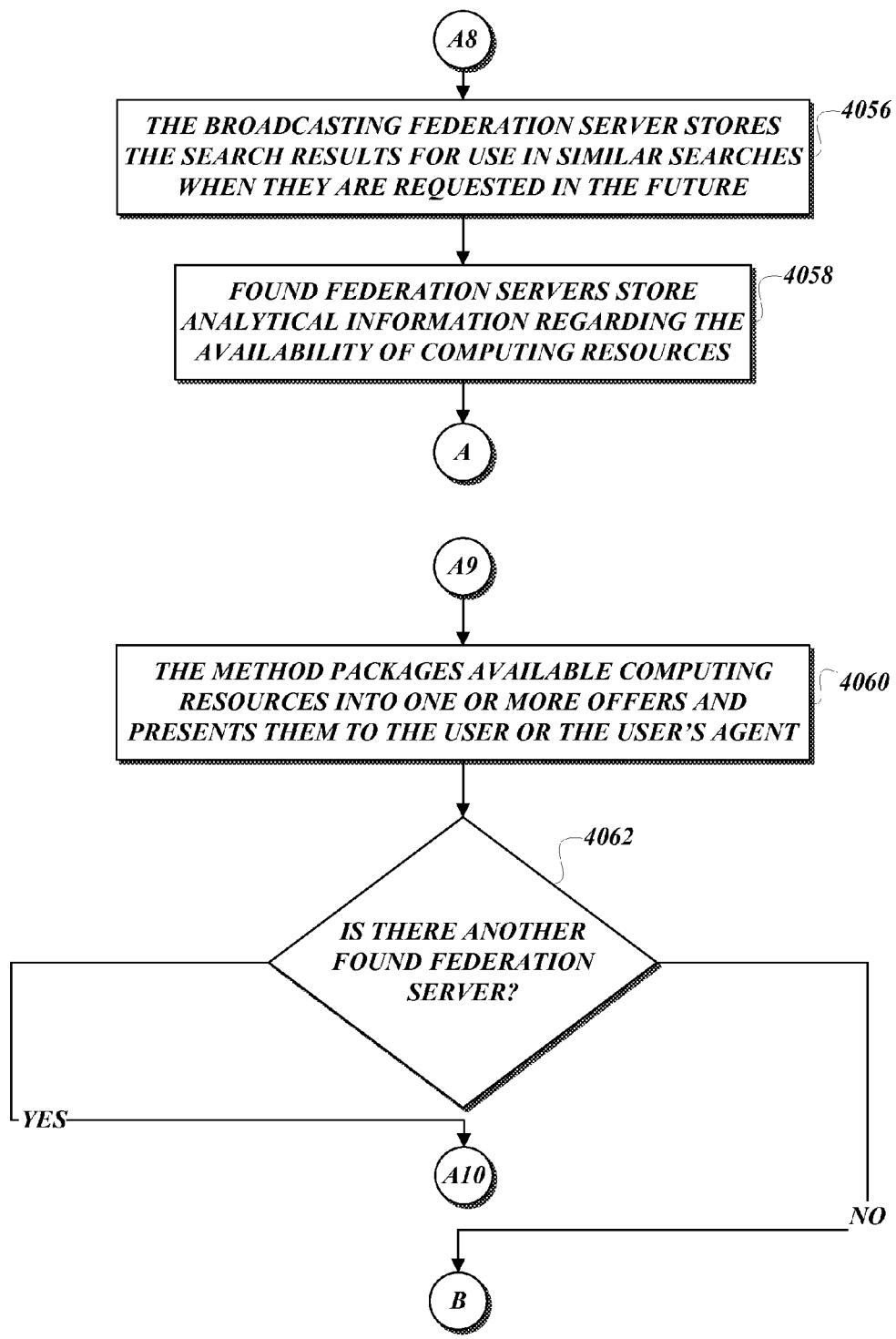
Figure 4H:
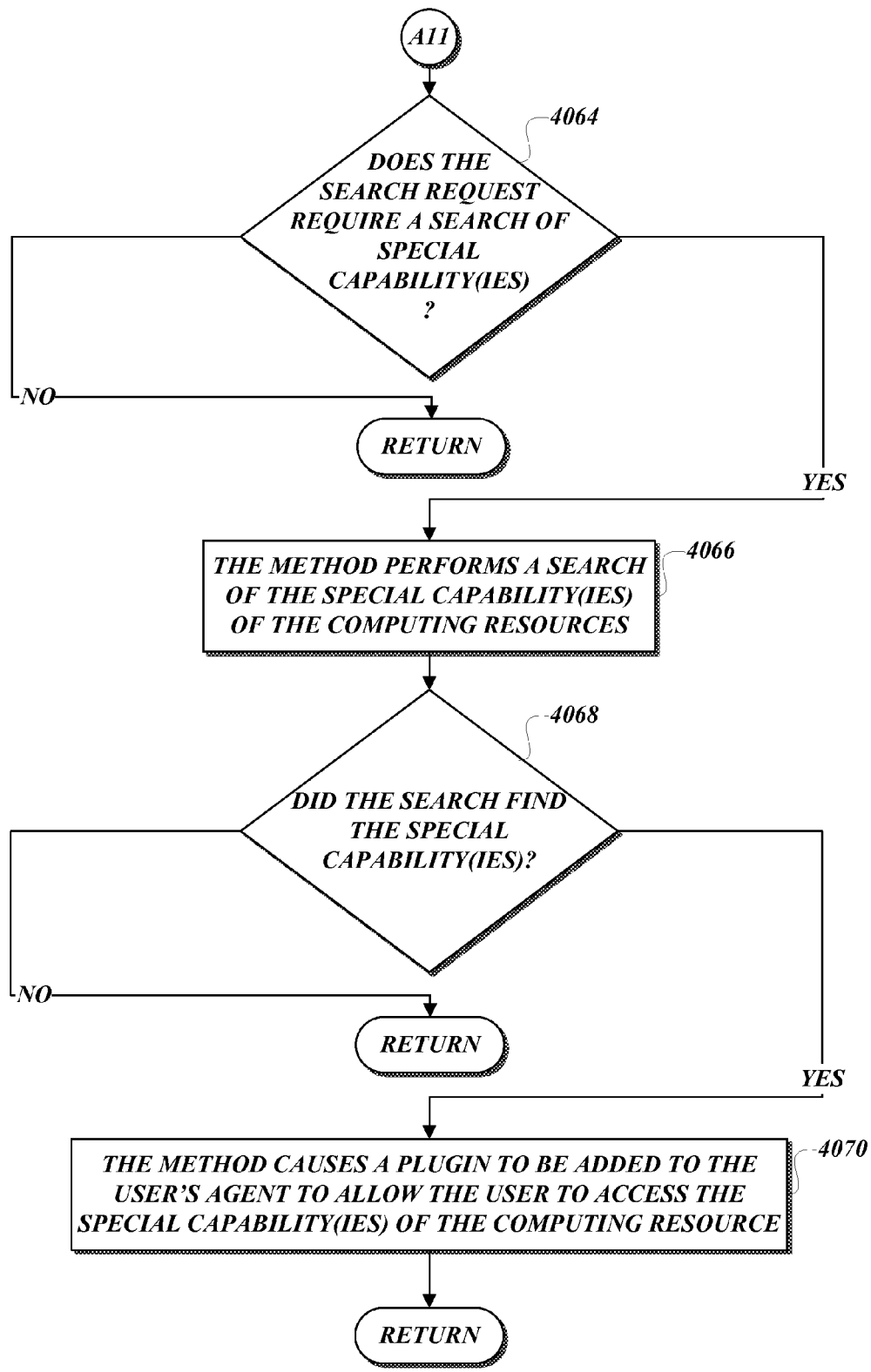
Figure 4I:
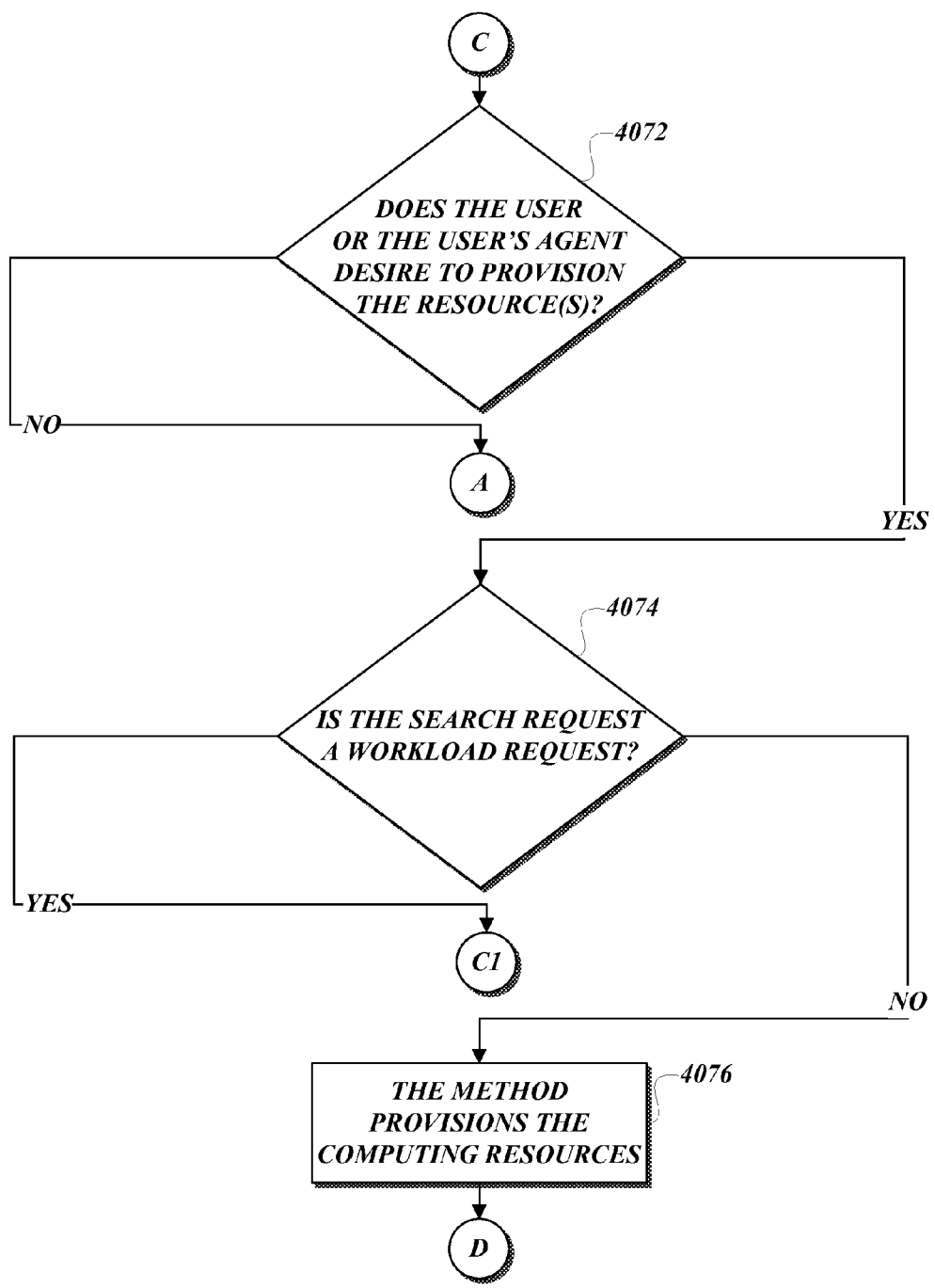
Figure 4J:
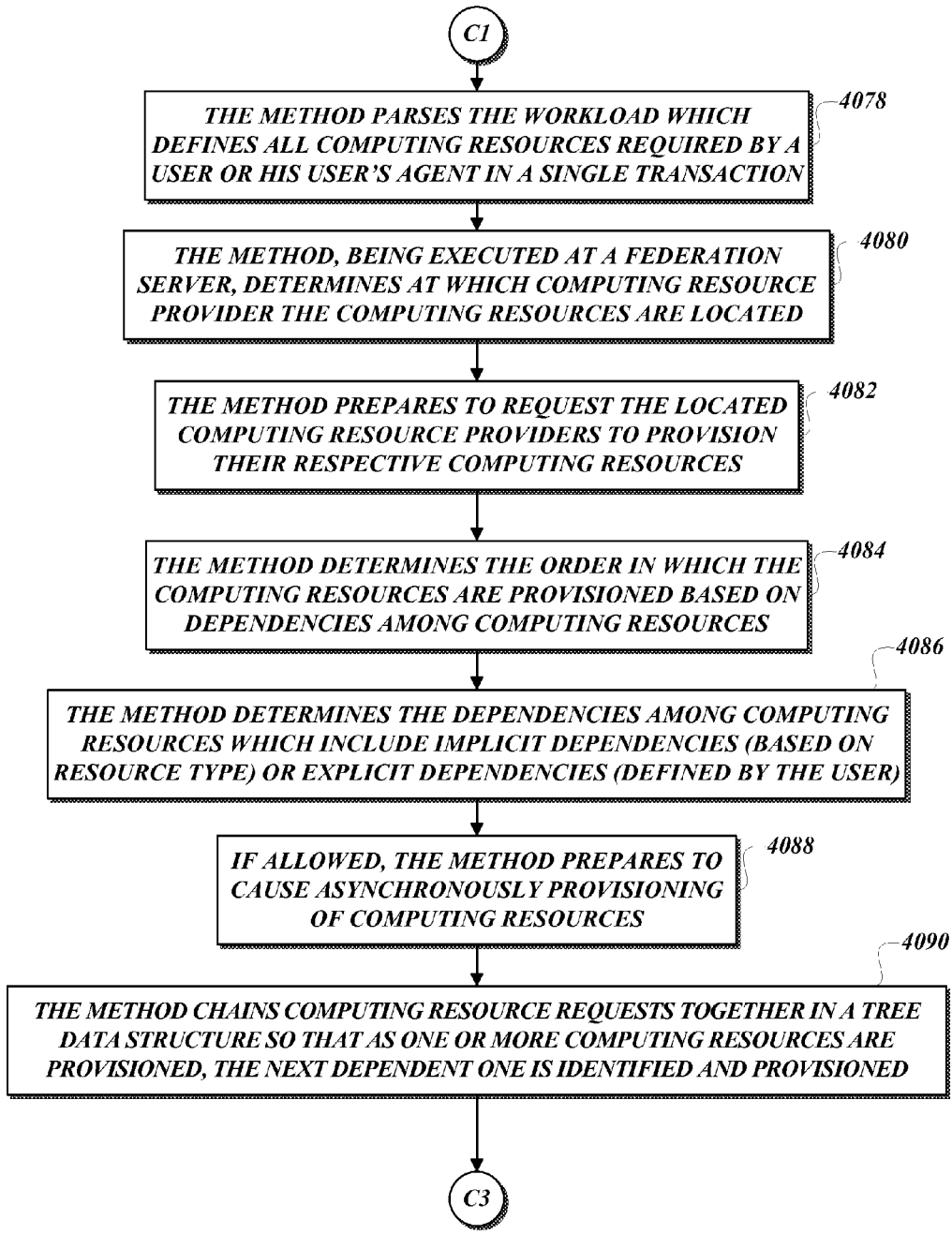
Figure 4K:
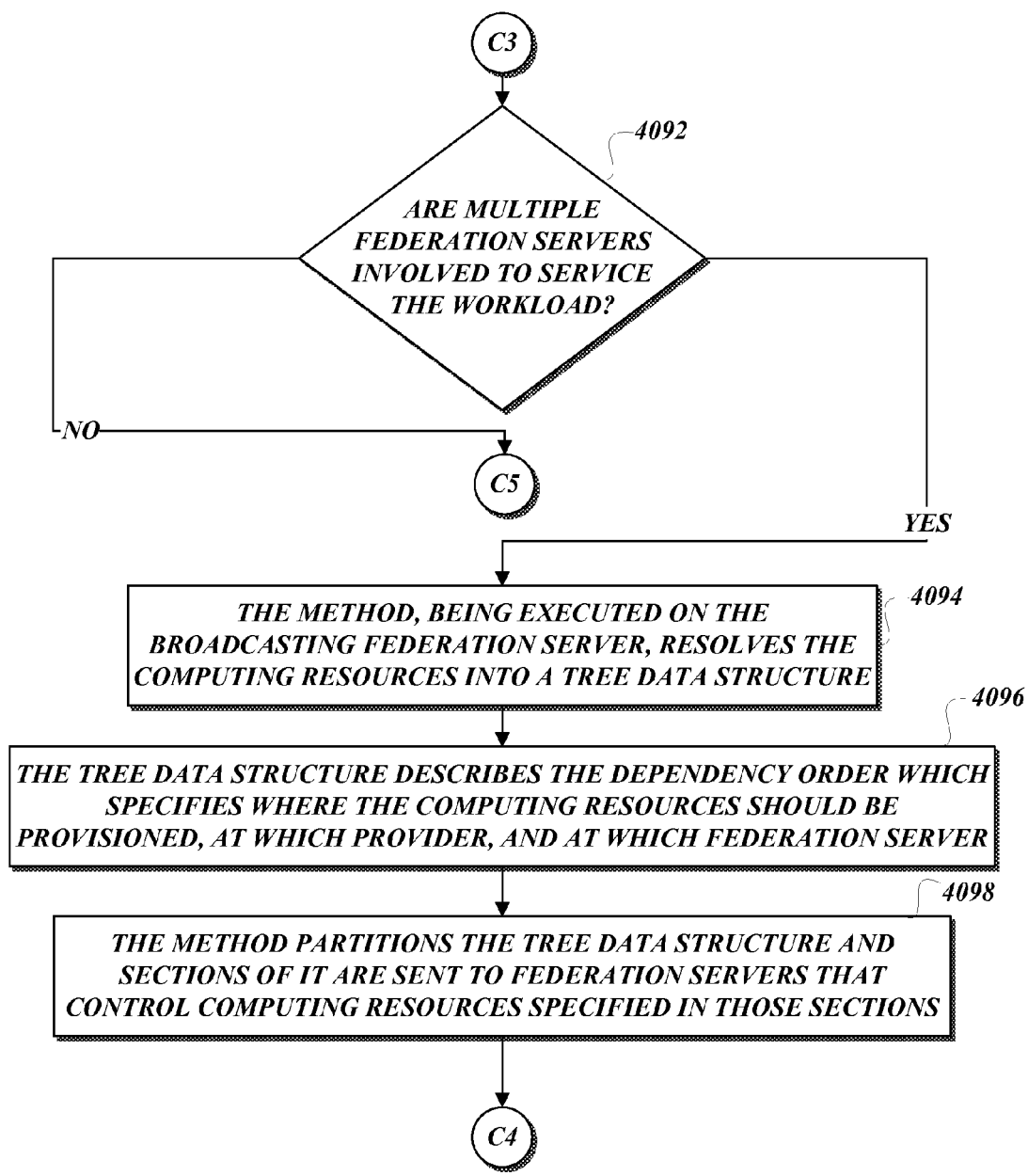
Figure 4L:
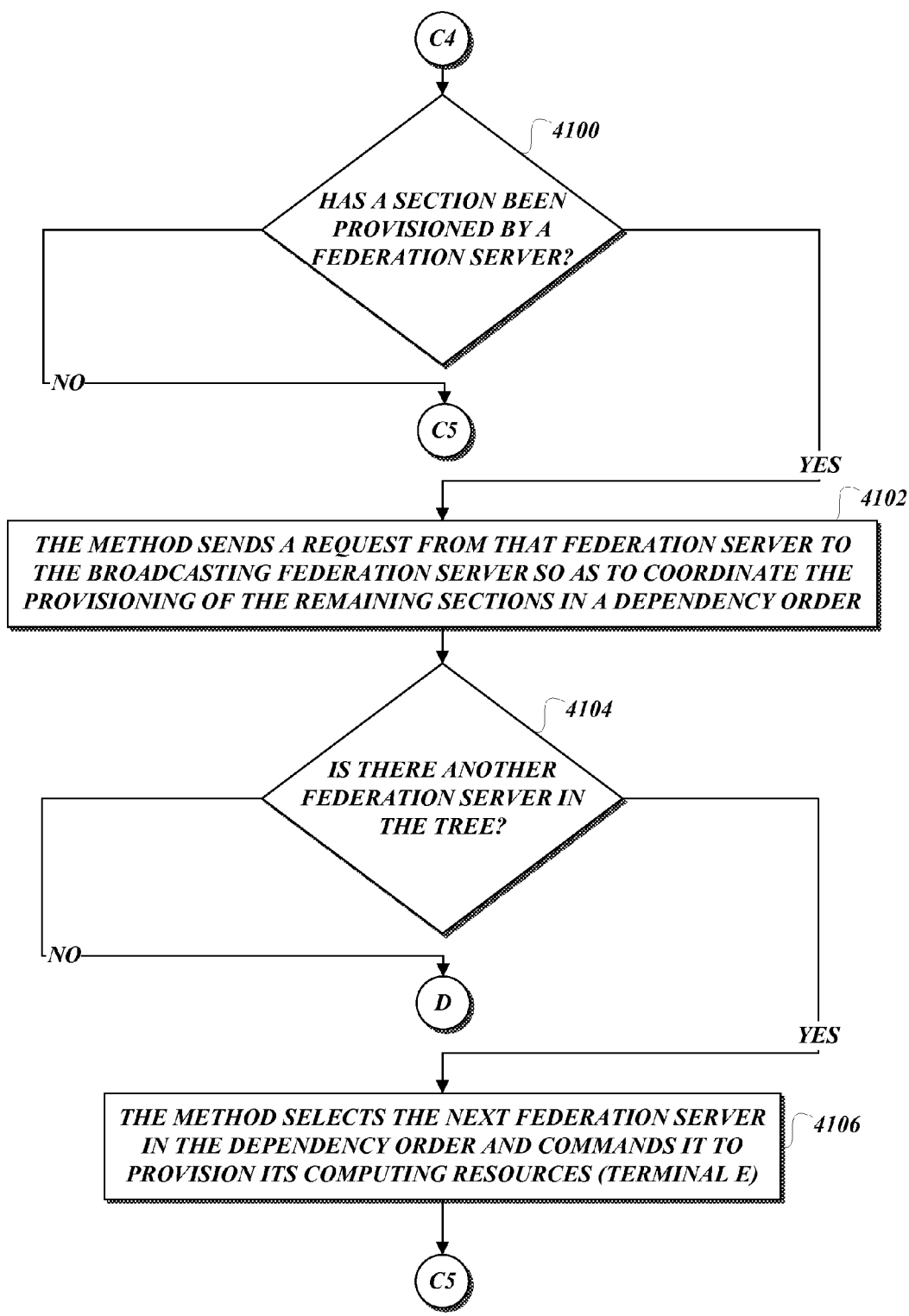
Figure 4M:
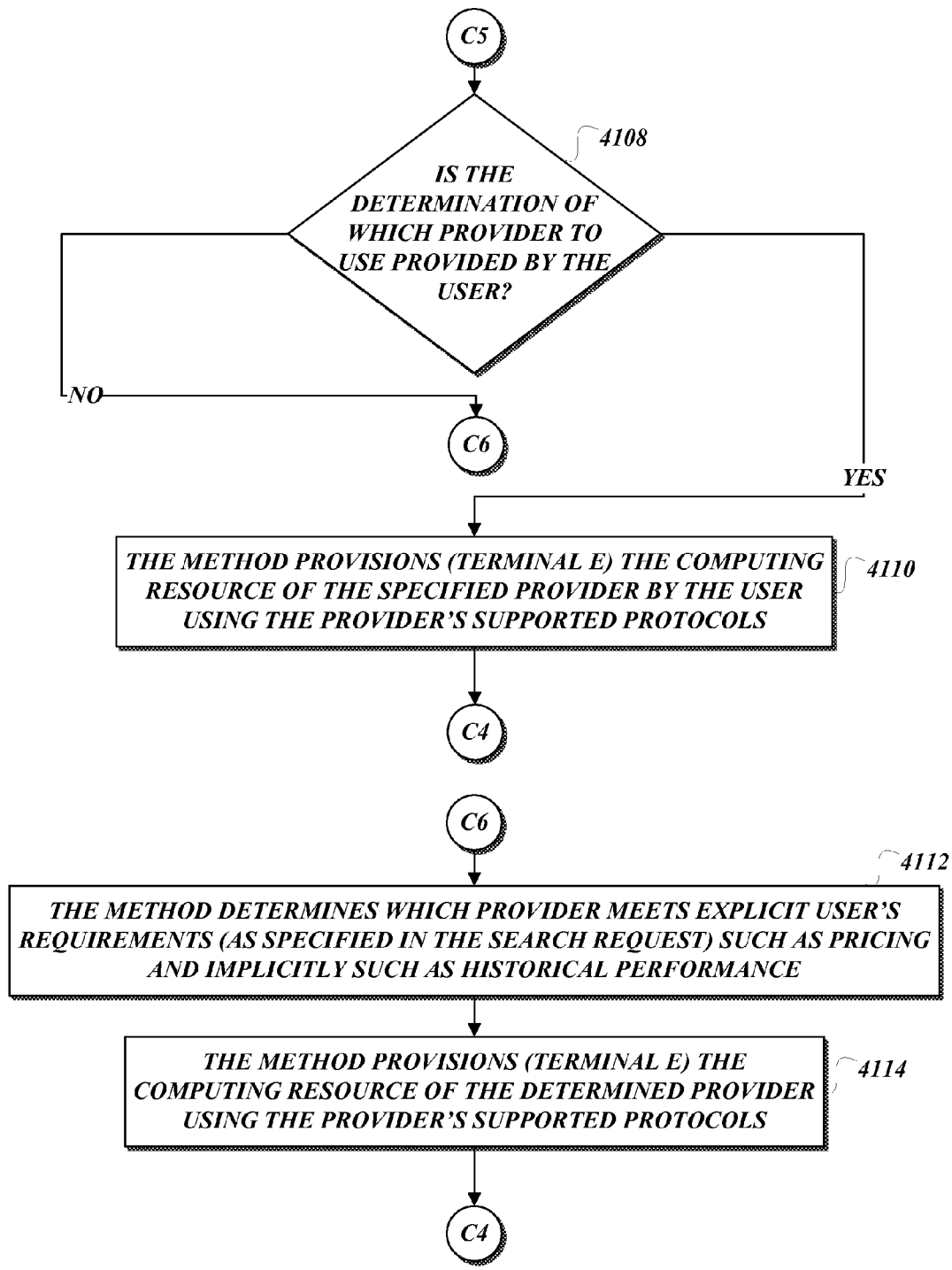
Figure 4N:
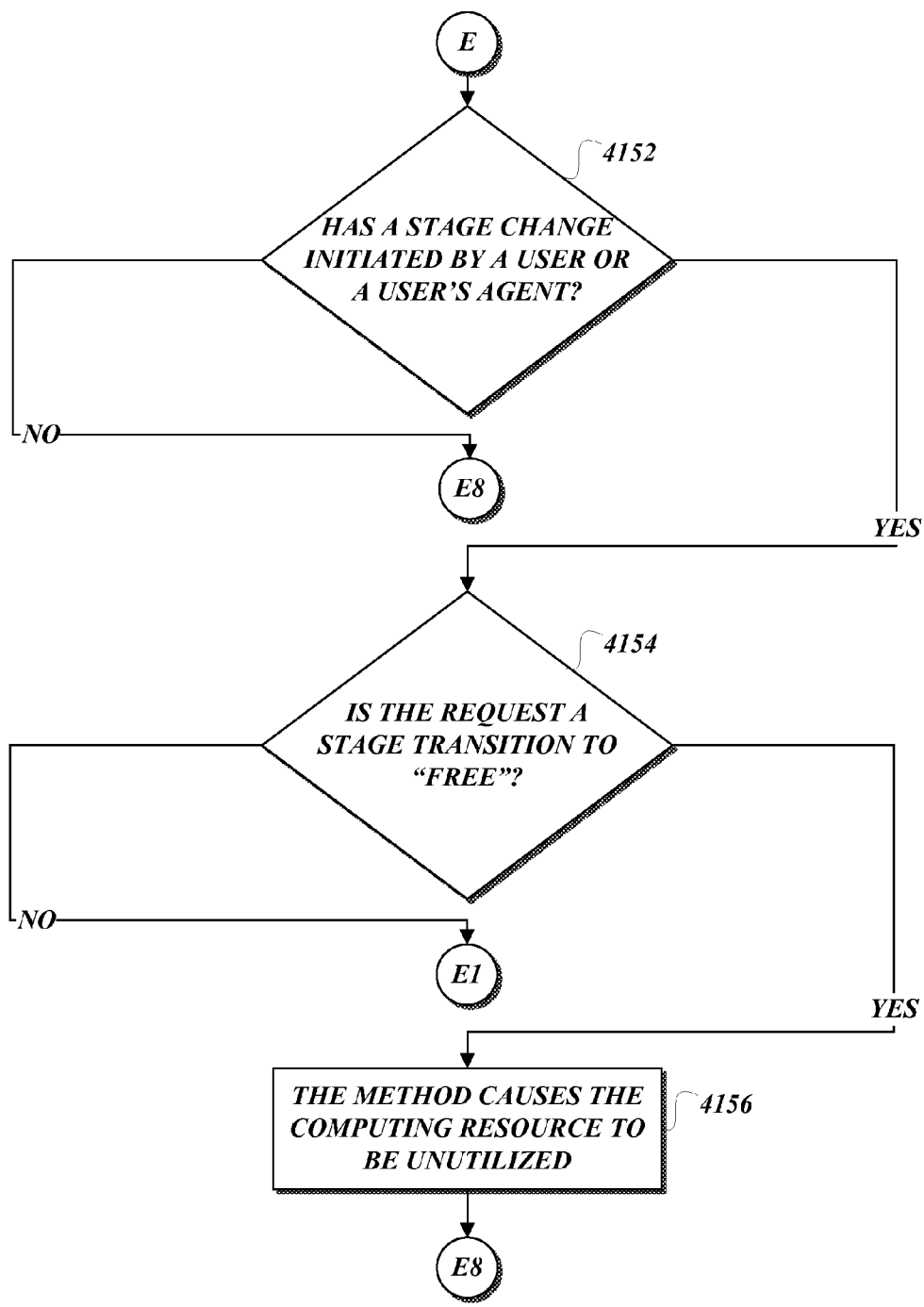
Figure 4O:
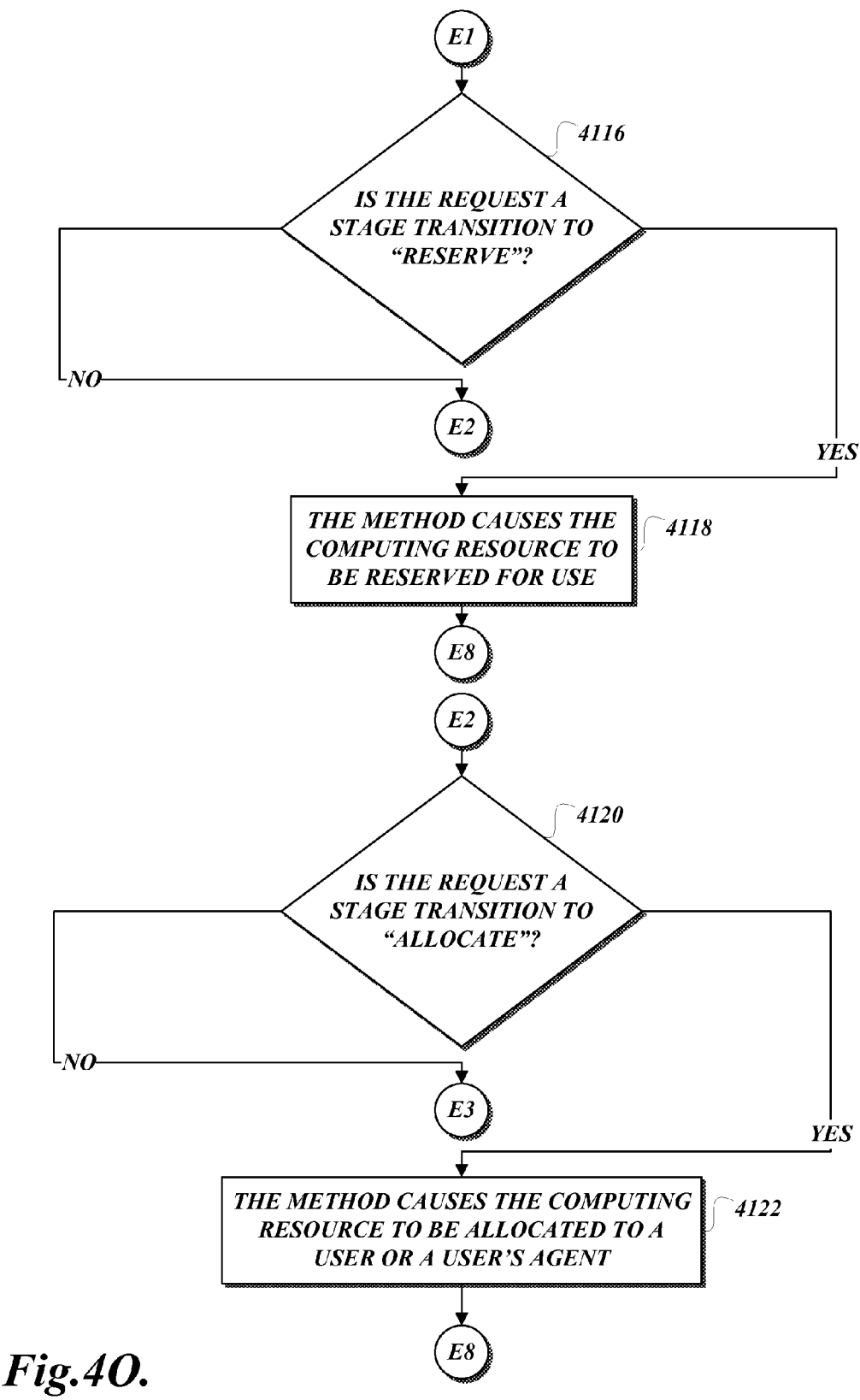
Figure 4P:
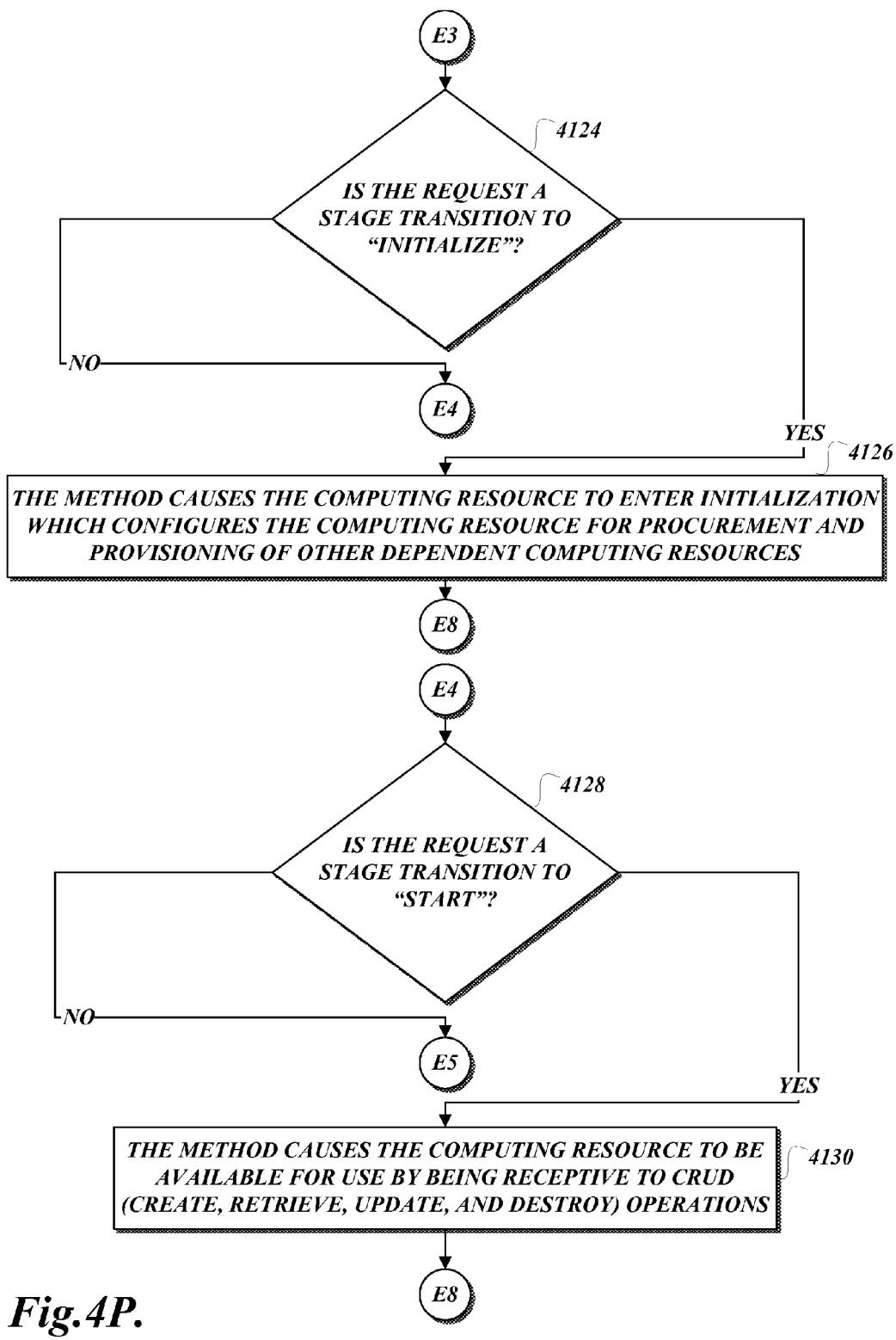
Figure 4Q:
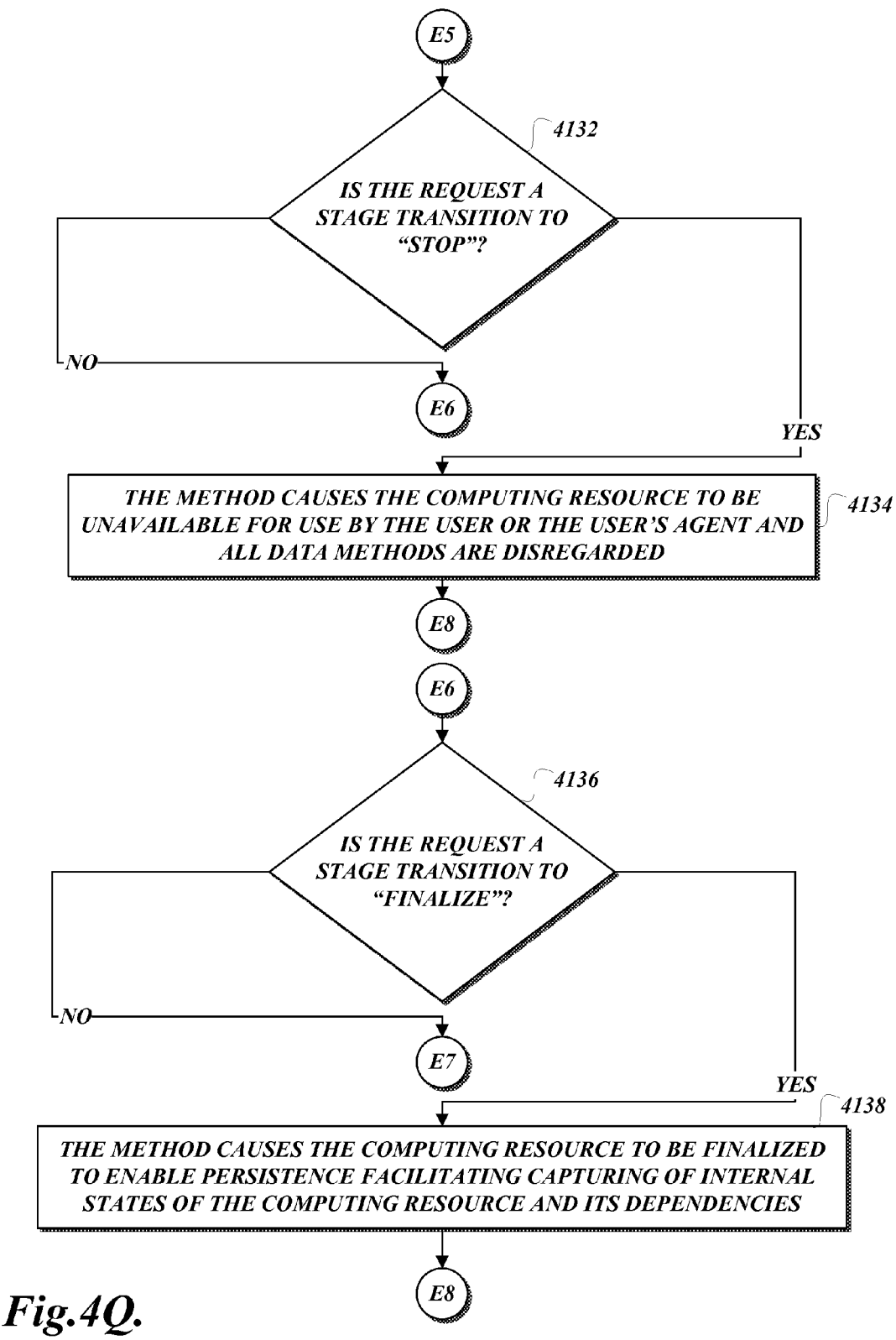
Figure 4R:
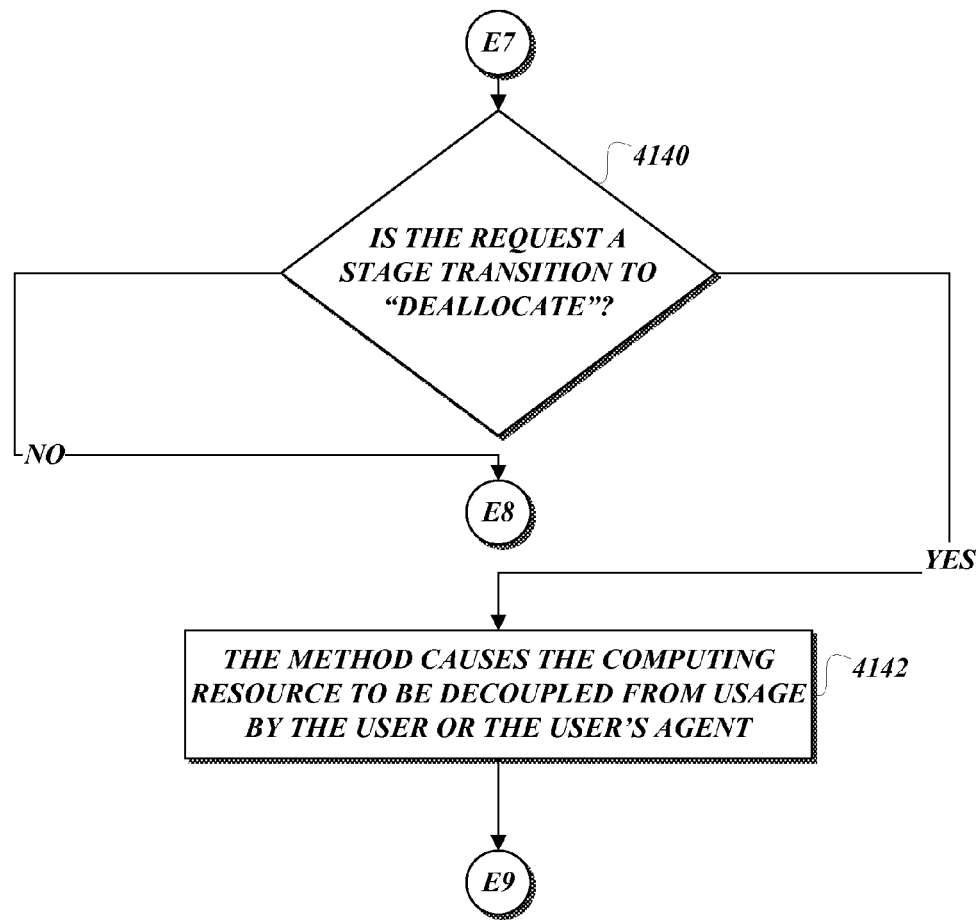
Figure 4S:
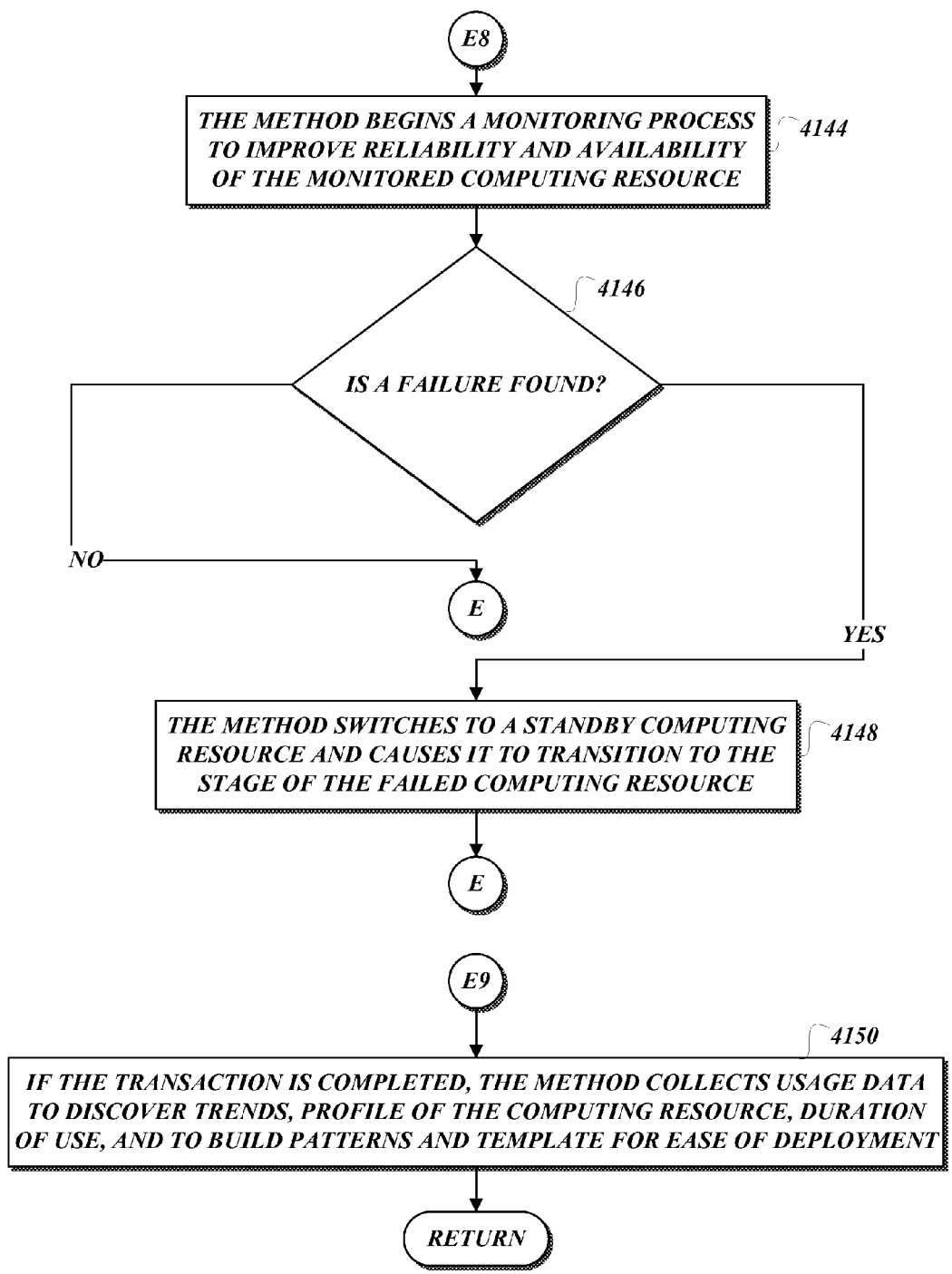

FIGS. 4A-4S illustrate a software method 4000 for organizing federations of computing resource providers and servicing search requests via pieces of networked hardware, such as those connected with the federations of marketplaces 100, 200, and 300. The software method 4000 facilitates selecting, procuring, and provisioning computing resources from heterogeneous on-demand computing environments through a framework of layered, federated on-demand computing ecology of computing resource providers, computing resources, and computing resource federation servers. Specifically, the software method 4000 in combination with pieces of networked hardware facilitate a mechanism for defining and managing the lifecycle of different resource types in some embodiments; a mechanism for extending existing document-centric protocols to support computing resources as first order objects with associated methods in a few embodiments; a mechanism for the routing of messages to computing resources from users' agents to computing resource federation servers and computing resource providers in other embodiments; a mechanism to pass through and make use of special features and capabilities of computing resources as exposed by their computing resource providers in further embodiments; a mechanism for users to register with a federation server to access and utilize computing resources from one or more providers registered with the same federation server in additional embodiments; a federation topology and different types of federation of marketplaces in some further embodiments; a mechanism for layering and enabling communication and coordination among federation servers to enable computing resource discovery and resolution in many embodiments; a mechanism for publishing and search across federation servers for computing resources and computing resource providers in certain embodiments; and a mechanism for federation servers to access and use computing resources from providers controlled by other federation servers in a number of embodiments.

From the start block, the method 4000 proceeds to a set of method steps 4002, defined between a continuation terminal ("terminal A") and an exit terminal ("terminal B"). The set of method steps 4002 describes the facilitation of search requests by the method for computing resources by routing messages among users' agents, federation servers, computing resources and their providers. From terminal A (FIG. 4B), the method 4000 proceeds to decision block 4008 where a test is performed to determine whether there is a new provider catalog. If the answer to the test at decision block 4008 is NO, the method continues to another continuation terminal ("terminal A3"). If the answer to the test at decision block 4008 is YES, then the method proceeds to block 4010 where the method receives a new provider catalog at a federation server (via an industry-standard format such as XML or JSON). Progressing to block 4012, the federation server broadcasts to connected federation servers that its provider catalogs have been updated. The term "connected" means the inclusion of networked as well as directly coupled federation servers. Progressing to decision block 4014, a test is performed to determine whether a hybrid model is activated. If the answer to the test at decision block 4014 is YES, the method proceeds to another continuation terminal ("terminal A2"). Otherwise, the answer to the test at decision block 4014 is NO, and the method proceeds to another continuation terminal ("terminal A1").

From terminal A1 (FIG. 4C), the method 4000 proceeds to block 4016 where the connected federation servers, via the method, may request the new provider catalog from the broadcasting federation server. At block 4018, after the catalog is received, the connected federation servers communicate either directly with the computing resource provider or indirectly via the broadcasting federation server. The method then continues to another continuation terminal, terminal A3. From terminal A2 (FIG. 4C), the method 4000 proceeds to block 4020 where the connected federation servers, via the method, may request the new provider catalog from the broadcasting federation server. At block 4022, after the catalog is received, the connected federation servers communicate directly with the computing resource provider. At block 4024, the connected federation servers apprise the broadcasting federation server of its direct communication with the computing resource provider for tracking purposes. The method then continues to terminal A3.

From terminal A3 (FIG. 4D), the method 4000 proceeds to decision block 4026 where a test is performed to determine whether there is a search request (on-demand computing query). If the answer to the test at decision block 4026 is NO, the method skips back to decision block 4008 where the above-identified processing steps are repeated. Otherwise, if the answer to the test at decision block 4026 is YES, the method proceeds to block 4028 where the method receives a new search request at a federation server (broadcasting federation server). At block 4030, the broadcasting federation server accesses its federation catalog to review other federation servers to which it is networked. The method then continues to another continuation terminal ("terminal A4"). From terminal A4 (FIG. 4D) the method 4000 proceeds to block 4032 where the broadcasting federation server accesses a provider catalog to thereby access computing resources of providers listed in the provider catalog. At block 4034, the broadcasting federation server determines which computing resources have been allocated and which remain available. At block 4036, the broadcasting federation server executes steps at terminal A11 to determine whether there are special features or capabilities of computing resources to be exposed. The method then continues to another continuation terminal ("terminal A5").

From terminal A5 (FIG. 4E), the method 4000 proceeds to decision block 4038 where a test is performed to determine whether there are found networked federation servers that meet search criteria. If the answer to the test at decision block 4038 is NO, the method proceeds to another continuation terminal ("terminal A9"). Otherwise, if the answer to the test at decision block 4038 is YES, then the method proceeds to another continuation terminal ("terminal A10"). From terminal A10 (FIG. 4E), the method proceeds to decision block 4040, where another test is performed to determine whether there is a found federation server willing to send its provider catalog. If the answer to the test at decision block 4040 is NO, the method proceeds to another continuation terminal ("terminal A6"). Otherwise, if the answer to the test at decision block 4040 is YES, then the method proceeds to block 4042 where the broadcasting federation server communicates with the found federation server and requests its provider catalog. At block 4044, the broadcasting federation server executes steps between terminals A4, A5 to determine the availability of computing resources at the found federation server. The method then continues to another continuation terminal ("terminal A7").

From terminal A6 (FIG. 4F), the method proceeds to block 4046 where the found federation server (such as one in a geographic area), via the method, receives the new search request from the broadcasting federation server. At block 4048, the found federation server controls a set of computing resource providers (via its provider catalog), each of which has its own catalog of computing resources that can be provisioned. At block 4050, the found federation server accesses a provider catalog that details the computing resources to which it has access. At block 4052, the found federation server determines which computing resources are available and communicates the search results to the broadcasting federation server. The method then continues to terminal A7 and proceeds further to decision block 4054 where a test is performed to determine whether the broadcasting federation server uses the search results. If the answer to the test at decision block 4054 is YES, the method continues to another continuation terminal, terminal A9. Otherwise, if the answer to the test at decision block 4054 is NO, the method continues to another continuation terminal ("terminal A8").

From terminal A8 (FIG. 4G), the method 4000 proceeds to block 4056 where the broadcasting federation server stores the search results for use in similar searches when they are requested in the future. At block 4058, found federation servers store analytical information regarding the availability of computing resources. The method then continues to terminal A and skips back to decision block 4008 where the above-identified processing steps are repeated.

From terminal A9 (FIG. 4G), the method 4000 proceeds to block 4060 where the method packages available computing resources into one or more offers and presents them to the user or the user's agent. At decision block 4062, a test is performed to determine whether there is another found federation server. If the answer to the test at decision block 4062 is YES, the method continues to terminal A10 and skips back to decision block 4040 where the above-identified processing steps are repeated. Otherwise, if the answer to the test at decision block 4062 is NO, the method continues to terminal A and skips back to decision block 4008 where the above-identified processing steps are repeated.

From terminal A11 (FIG. 4H), the method 4000 proceeds to decision block 4064 where a test is performed to determine whether the search request requires a search for a special capability or capabilities as well as services. If the answer to the test at decision block 4064 is NO, the method returns to the invoking step, such as step 4036 of FIG. 4D. If the answer to the test at decision block 4064 is YES, the method proceeds to block 4066 where the method performs a search of the special capability or capabilities of the computing resources. The method then continues to another decision block 4068 where another test is performed to determine whether the search finds the special capability or capabilities. If the answer to the test at decision block 4068 is NO, the method returns to the invoking step, such as step 4036 of FIG. 4D. Otherwise, if the answer to the test at decision block 4068 is YES, the method continues to block 4070 where the method causes a plug-in to be added to the user's agent to allow the user to access the special capability or capabilities of the computing resource. The method then returns to the invoking step, such as step 4036.

From terminal B (FIG. 4A), the method 4000 proceeds to a set of method steps 4004 defined between a continuation terminal ("terminal C") and an exit terminal ("terminal D"). The set of method steps 4004 provisions the discovered computing resources. From terminal C (FIG. 4I), the method 4000 proceeds to decision block 4072 where a test is performed to determine whether the user or the user's agent desires to provision the resources. If the answer to the test at decision block 4072 is NO, the method 4000 proceeds to terminal A and skips back to decision block 4008 where the above-identified processing steps are repeated. Otherwise, if the answer to the test at decision block 4072 is YES, the method proceeds to another decision block 4074 where another test is performed to determine whether the search request is a workload request. If the answer to the test at decision block 4074 is YES, the method continues to another continuation terminal ("terminal C1"). Otherwise, if the answer to the test at decision block 4074 is NO, the method 4000 proceeds to block 4076 where the method provisions the computing resources. The method then continues to exit terminal D.

From terminal C1 (FIG. 4J), the method 4000 proceeds to block 4078 where the method parses the workload which defines all computing resources required by a user or his user's agent in a single transaction. At block 4080, the method, being executed at a federation server, determine at which computing resource provider the computing resources are located. At block 4082, the method prepares to request the located computing resource providers to provision their respective computing resources. At block 4084, the method determines the order in which the computing resources are provisioned based on dependencies among computing resources. At block 4086, the method determines the dependencies among computing resources which include implicit dependencies (based on resource type) or explicit dependencies (defined by the user). At block 4088, if allowed, the method prepares to cause a synchronous provisioning of computing resources. At block 4090, the method chains computing resource requests together in a tree data structure so that as one or more computing resources are provisioned, the next dependent one is identified and provisioned. The method continues to another continuation terminal ("terminal C3").

From terminal C3 (FIG. 4K), the method 4000 proceeds to decision block 4092 where a test is performed to determine whether multiple federation servers are involved to service the workload. If the answer to the test at decision block 4092 is NO, the method continues to another continuation terminal ("terminal C5"). Otherwise, if the answer to the test at decision block 4092 is YES, the method proceeds to block 4094 where the method, being executed on the broadcasting federation server, resolves the computing resources into a tree data structure. At block 4096, the tree data structure describes the dependency order which specifies where the computing resources should be provisioned, at which provider, and at which federation server. At block 4098, the method partitions the tree data structure and sections of it are sent to federation servers that control computing resources specified in those sections. The method then continues to another continuation terminal ("terminal C4").

From terminal C4 (FIG. 4L), the method 4000 proceeds to decision block 4100 where a test is performed to determine whether a section has been provisioned by a federation server. If the answer to the test at decision block 4100 is NO, the method continues to terminal C5. Otherwise, if the answer to the test at decision block 4100 is YES, the method 4000 proceeds to block 4102 where the method sends a request from that federation server to the broadcasting federation server so as to coordinate the provisioning of the remaining sections in a dependency order. The method then continues to another decision block 4104 where another test is performed to determine whether there is another federation server in the tree. If the answer to the test at decision block 4104 is NO, the method continues to exit terminal D. Otherwise, if the answer to the test at decision block 4104 is YES, the method proceeds to block 4106 where the method selects the next federation server in the dependency order and commands it to provision its computing resources. See terminal E. The method then continues to terminal C5.

From terminal C5 (FIG. 4M), the method 4000 proceeds to decision block 4108 where a test is performed to determine whether the determination of which provider to use is provided by the user. If the answer to the test at decision block 4108 is NO, the method proceeds to another continuation terminal ("terminal C6"). Otherwise, if the answer to the test at decision block 4108 is YES, the method proceeds to block 4110 where the method provisions the computing resource of the specified provider by the user using the provider's supported protocols. See terminal E. The method then continues to terminal C4 and skips back to decision block 4100 where the above-identified processing steps are repeated.

From terminal C6 (FIG. 4M), the method 4000 proceeds to block 4112 where the method determines which provider meets explicit users' requirements (as specified in the search request) such as pricing and implicit ones such as historical performance, among others such as clauses in a service level agreement. The method then continues to block 4114 where the method provisions the computing resource of the determined provider using the provider's supported protocols. See terminal E. The method then continues to terminal C4 and skips back to decision block 4100 where the above-identified processing steps are repeated.

From terminal D (FIG. 4A), the method 4000 proceeds to a set of method steps 4006 defined between a continuation terminal ("terminal E") and an exit terminal ("terminal F"). The set of method steps 4006 executes a life cycle stage transition of computing resources including their un-provisioning. The different stages of computing resources are described herein below. The actions that are performed when a computing resource is assigned a particular stage depend on the computing resource's current stage, the type of the computing resource and the values of one or more of the computing resource's attributes. The state and action that result in the computing resource attaining a particular stage are identified by the stage name. For example, allocate is the action that leads the computing resource to attain the stage of "allocate". Typical interpretations of the stage and possible actions that can be performed on the resources are identified below along with an example of a virtual machine type of computing resource.

From terminal E (FIG. 4N), the method 4000 proceeds to decision block 4152 where a test is performed to determine whether a stage change has been initiated by a user or a user's agent. If the answer to the test at decision block 4152 is NO, the method proceeds to another continuation terminal ("terminal E8"). It would be appreciated by one skilled in the art that stages identified for a particular computing resource are a combination of the stages of the computing resources it constitutes. Digressing to a virtual machine example, an instance of a virtual machine includes the virtual machine along with an image of an operating system and pieces of software to be run on the instance. Each of these computing resources (operating system and pieces of software) have their own stages and actions with their own stage changes. The stages of the virtual machine, operating system, and pieces of software are included in the stage changes identified together.

Returning to decision block 4152, if the answer to the test at decision block 4152 is YES, the method proceeds to another decision block 4154 where another test is performed to determine whether the request is a stage transition to "free" stage. If the answer to the test at decision block 4154 is NO, the method continues to another continuation terminal ("terminal E1"). Otherwise, if the answer to the test at decision block 4154 is YES, the method proceeds to block 4156 where the method causes the computing resource to be unutilized. (The computing resource may not have a physical realization.) The method then continues to another continuation terminal, terminal E8. Digressing to the virtual machine example, the "free" stage indicates that the virtual machine is available for use. A virtual machine is typically realized on top of a physical machine. In this "free" stage, a virtual machine is not addressable as it is not understood to be materialized as an addressable machine in any physical device.

Returning from the digression, from terminal E1 (FIG. 4O), the method 4000 proceeds to decision block 4116 where a test is performed to determine whether the request is a stage transition to a "reserve" stage. If the answer to the test at decision block 4116 is NO, the method continues to another continuation terminal ("terminal E2"). Otherwise, if the answer to the test at decision block 4116 is YES, the method proceeds to block 4118 where the method causes the computing resource to be reserved for use. The "reserve" stage and associated actions provide an opportunity to check and ensure that the computing resource can be assigned and utilized by a given user. The method then continues to terminal E8. Digressing to the virtual machine example, the virtual machine computing resource with appropriate attributes is reserved. This stage and associated actions can be used to check if a virtual machine with given specifications can be allocated to the user.

Returning from the digression, from terminal E2 (FIG. 4O), the method 4000 proceeds to decision block 4120 where a test is performed to determine whether the request is a stage transition to an "allocate" stage. If the answer to the test at decision block 4120 is NO, the method continues to another continuation terminal ("terminal E3"). Otherwise, if the answer to the test at decision block 4120 is YES, the method 4000 proceeds to block 4122 where the method causes the computing resource to be allocated to a user or a user's agent. This stage usually marks the start time for utilizing the computing resource by the user. The method then continues to another continuation terminal, terminal E8. Digressing to the virtual machine example, allocating a virtual machine corresponds to identifying a particular physical machine that would host the virtual machine. Such allocated computing resources are identified to be used by a particular user and cannot be accessed by others.

Returning from the digression, from terminal E3 (FIG. 4P), the method 4000 proceeds to decision block 4124 where a test is performed to determine whether the request is a stage transition to an "initialize" stage or a "construct" stage. If the answer to the test at decision block 4124 is NO, the method proceeds to another continuation terminal ("terminal E4"). Otherwise, if the answer to the test at decision block 4124 is YES, the method proceeds to block 4126 where the method causes the computing resource to enter initialization which configures the computing resource for procurement and provisioning of other dependent computing resources. The method then continues to another continuation terminal, terminal E8. Digressing to the virtual machine example, the operating system and/or software images are typically initialized in this stage. Such computing resources go through their own life cycle in the "initialize" stage and a complementary "finalize" stage, which is discussed herein below.

From terminal E4 (FIG. 4P), the method continues to decision block 4128 where a test is performed to determine whether the request is a stage transition to a "start" stage. If the answer to the test at decision block 4128 is NO, the method continues to another continuation terminal ("terminal E5"). Otherwise, if the answer to the test at decision block 4128 is YES, the method continues to block 4130 where the method causes the computing resource to be available for use by being receptive to CRUD operations, such as create, retrieve, update, and destroy operations. The method then continues to another continuation terminal, terminal E8. Digressing to the virtual machine example, the virtual machine along with its image can be started using the "start" action. The virtual machine is operational once in this stage and can be accessed and utilized through interface and components hosted by the virtual machine.

Returning from the digression, from terminal E5 (FIG. 4Q), the method proceeds to decision block 4132 where a test is performed to determine whether the request is a stage transition to a "stop" stage. If the answer to the test at decision block 4132 is NO, the method continues to another continuation terminal ("terminal E6"). Otherwise, if the answer to the test at decision block 4132 is YES, the method proceeds to block 4134 where the method causes the computing resource to be unavailable for use by the user or the user's agent and all data methods are disregarded. The method then continues to another continuation terminal, terminal E8. Digressing to the virtual machine example, a virtual machine in the "stop" stage cannot be used by its user. Subsequent data methods are disregarded.

Returning from the digression, from terminal E6 (FIG. 4Q), the method 4000 progresses to decision block 4136 where a test is performed to determine whether the request is a stage transition to a "finalize" stage. If the answer to the test at decision block 4136 is NO, the method proceeds to another continuation terminal ("terminal E7"). Otherwise, if the answer to the test at decision block 4136 is YES, the method proceeds to block 4138 where the method causes the computing resource to be finalized to enable persistence, facilitating capturing of internal states of the computing resource and its dependencies before the transition to a "deallocate" stage which is discussed herein below. The method then continues to another continuation terminal, terminal E8. Digressing to the virtual machine example, the virtual machine resource finalization can be used to persist the image of the virtual machine for later use.

Returning from the digression, from terminal E7 (FIG. 4R), the method proceeds to decision block 4140 where a test is performed to determine whether the request is a stage transition to "deallocate" stage. If the answer to the test at decision block 4140 is NO, the method continues to terminal E8. Otherwise, if the answer to the test at decision block 4140 is YES, the method causes the computing resource to be decoupled from usage by the user or the user's agent. See block 4142. This typically marks the end time for the usage of the computing resource by the user. The method then continues to another continuation terminal ("terminal E9"). Digressing to the virtual machine example, the virtual memory de-allocation releases the appropriate computing resource to the physical machine for use by subsequent users. The deallocated computing resource automatically transitions to a "free" stage.

Returning from the digression, from terminal E8 (FIG. 4S), at block 414, the method begins a monitoring process to improve reliability and availability of the monitored computing resource. A test is performed at decision block 4146 to determine whether a failure has been found. If the answer to the test at decision block 4146 is NO, the method continues to terminal E and skips back to decision block 4152 where the above-identified processing steps are repeated. Otherwise, if the answer to the test at decision block 4146 is YES, the method proceeds to block 4148 where the method switches to a standby computing resource and causes it to transition to the stage of a failed computing resource. The method then continues to terminal E and skips back to decision block 4152 where the above-identified processing steps are repeated.

From terminal E9 (FIG. 4S), the method proceeds to block 4150 where if the transaction is completed, the method collects usage data to discover trends, a profile of the computing resource, duration of use, and so on, so as to build patterns and templates for ease of deployment in the future. The method then returns to the invoking step.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system, comprising:
   first and second federation servers each with a set of registered computing resource providers, wherein a computing resource provider offers computing resources in different software and services consumption models including Infrastructure as a Service, Platform as a Service and Software as a Service, wherein the computing resource provider offers information on what types of computing resources are allocated and what types are available to be allocated to registered users who issue on-demand computing requests; and
   wherein the first federation server is unified with the second federation server such that the first federation server has a computer-readable federation catalog that lists computing service providers and their computing resource offers to satisfy the on-demand computing requests, wherein the federation catalog of the first federation server lists the second federation server, when registered, as a computing resource provider, and wherein the federation catalog of the second federation server, when registered, as a computing resource provider, lists the first federation server, when registered, as a computing resource provider, wherein the first federation server provides an interface that, on request, provides updated, computer-readable catalogs of computing resources and computing resource providers linked to the first federation server, wherein the second federation server maintains communication with the first federation server to request an updated computer-readable catalog of computing resources and computing resource providers registered to the first federation server, or communicate a user's on-demand computing request to the first federation server or list, provision, use, and manage resources for
   an on-demand computing request addressed by the first federation server and the computing resource providers registered with it.

2. The system of claim 1, wherein a computing resource provider is registered to the first federation server, to the second federation server, or to both the first and second federation servers.

3. The system of claim 1, wherein the second federation server is configured to list, match and satisfy a user's on-demand computing request based on one or more computing resources of one or more registered computing resource providers of the first federation server.

4. The system of claim 1, wherein the first federation server is configured to transmit or provide such information on demand through the interface to the second federation server a new or incremental computer-readable federation catalog when the new computer-readable computing resources catalog is received by the first federation server from a registered computing resource provider.

5. The system of claim 1, wherein allowed actions and access to the first federation server are configured or restricted, including which computing resource provider and what types of resources a registered user can list, provision, use and manage.

6. The system of claim 1, wherein the second federation server is configured to allow a user registered with the second federation server to list, provision, utilize, and manage computing resources from a set of computing resource providers registered with the first federation server, which have been determined by the second federation server to be available.

7. The system of claim 1, wherein the registered user of the first federation server submits to the first federation server an on-demand computing request which includes a workload that describes the different computing services the user wants to satisfy the user's computing requests which defines dependencies among computing resources and which in turn defines an order in which those computing resources are provisioned, the first and second federation servers determining a computing resource provider who provisions each computing resource.

8. The system of claim 7, wherein the workload description is interpreted as the set of computing services, their dependencies and configurations that satisfy the user's computing requests that are offered by one or more computing resource providers registered with the first or the second federation servers.

9. The system of claim 7, wherein the first federation server responds to the user's request with information on the computing resource provider and the computing resource options for the user and optionally selects and executes the workload to provision and manage the requested computing resources.

10. The system of claim 1, wherein the first federation server registers with the second federation server as a computing service provider and provides registered users of the second federation server information and access to the registered computing resource providers and their computing resources in the first federation server.

11. The system of claim 10, wherein the registration of the first federation server with the second federation server forms a topology having a hierarchy of connections and networks among the federation servers that facilitate interconnection of federation servers, the hierarchy covering a country-wide federation, global federation, or cliques among regional federations.

12. The system of claim 10, where one or more federation servers in the inter-connection of federation servers are categorized to be part of a grouping that serves only to the requests of registered users belonging to a group.

* * * * *